United States Patent
Islam et al.

(10) Patent No.: US 7,034,975 B1
(45) Date of Patent: Apr. 25, 2006

(54) HIGH SPEED MEMS DEVICE

(75) Inventors: Mohammed N. Islam, Allen, TX (US); Amos Kuditcher, Allen, TX (US)

(73) Assignee: Cheetah Onmi, LLC, Ann Arbor, MI (US)

( * ) Notice: Subject to any disclaimer, the term of this patent is extended or adjusted under 35 U.S.C. 154(b) by 75 days.

(21) Appl. No.: 10/144,694

(22) Filed: May 13, 2002

Related U.S. Application Data

(60) Provisional application No. 60/336,779, filed on Dec. 3, 2001.

(51) Int. Cl.
*G02B 26/08* (2006.01)

(52) U.S. Cl. ...................... 359/223; 359/578

(58) Field of Classification Search ............... 359/578, 359/223, 198
See application file for complete search history.

(56) References Cited

U.S. PATENT DOCUMENTS

| | | | |
|---|---|---|---|
| 3,986,020 A | 10/1976 | Kogelnik | 250/199 |
| 4,797,879 A | 1/1989 | Habbab et al. | 370/3 |
| 4,873,681 A | 10/1989 | Arthurs et al. | 370/3 |
| 4,970,714 A | 11/1990 | Chen et al. | 370/17 |
| 5,005,167 A | 4/1991 | Arthurs et al. | 370/4 |
| 5,063,612 A | 11/1991 | McKeown | 455/607 |
| 5,093,743 A | 3/1992 | Eng et al. | 359/578 |
| 5,103,340 A | 4/1992 | Dono et al. | 385/46 |
| 5,140,655 A | 8/1992 | Bergmann | 359/120 |
| 5,191,626 A | 3/1993 | Stern | 385/24 |
| 5,206,638 A | 4/1993 | McKeown | 340/825.51 |
| 5,257,113 A | 10/1993 | Chen et al. | 358/426 |
| 5,301,052 A | 4/1994 | Audouin et al. | 359/124 |
| 5,343,542 A | 8/1994 | Kash et al. | 385/31 |
| 5,361,254 A | 11/1994 | Storck et al. | 370/57 |
| 5,452,115 A | 9/1995 | Tomioka | 359/123 |
| 5,455,699 A | 10/1995 | Glance et al. | 359/125 |
| 5,455,701 A | 10/1995 | Eng et al. | 359/135 |
| 5,485,297 A | 1/1996 | Sotom | 359/123 |
| 5,500,761 A | 3/1996 | Coossen et al. | 359/290 |
| 5,500,858 A | 3/1996 | McKeown | 370/60 |
| 5,506,712 A | 4/1996 | Sasayama et al. | 359/123 |
| 5,515,361 A | 5/1996 | Li et al. | 370/15 |
| 5,519,526 A | 5/1996 | Chua et al. | 359/152 |
| 5,521,732 A | 5/1996 | Nishio | 359/120 |
| 5,539,559 A | 7/1996 | Cisneros et al. | 359/117 |
| 5,550,373 A * | 8/1996 | Cole et al. | 250/338.1 |
| 5,729,527 A | 3/1998 | Gerstel et al. | 370/228 |

(Continued)

FOREIGN PATENT DOCUMENTS

EP    0 412 220 A1    8/1989

(Continued)

OTHER PUBLICATIONS

NASA, "Micromachined Opto/Electro/Mechanical Systems", Mar. 1997, NASA Tech Briefs, pp. 50 and 52.*

(Continued)

*Primary Examiner*—Euncha P. Cherry
(74) *Attorney, Agent, or Firm*—Baker Botts L.L.P.

(57) ABSTRACT

An interferometric micro electro-mechanical switching (MEMS) device includes an interferometer. The interferometer includes an optical cavity having a depth and formed between an inner mirror assembly and an outer mirror assembly. The MEMS device further includes an actuator coupled to the interferometer. The actuator includes an electrode gap having a depth and formed between an inner conductor and an outer conductor. In one particular embodiment, the depth of the optical cavity and the depth of the electrode gap are capable of being selected substantially independently of one another.

37 Claims, 11 Drawing Sheets

U.S. PATENT DOCUMENTS

| | | | |
|---|---|---|---|
| 5,739,945 A | 4/1998 | Tayebati | 359/291 |
| 5,751,469 A | 5/1998 | Arney et al. | 359/291 |
| 5,781,537 A | 7/1998 | Ramaswami et al. | 370/254 |
| 5,793,746 A | 8/1998 | Gerstel et al. | 370/228 |
| 5,825,949 A | 10/1998 | Choy et al. | 385/24 |
| 5,847,852 A | 12/1998 | Domon et al. | 359/118 |
| 5,864,414 A | 1/1999 | Barnsley et al. | 359/125 |
| 5,889,600 A | 3/1999 | McGuire | 359/128 |
| 5,915,054 A | 6/1999 | Ota | 385/46 |
| 5,923,644 A | 7/1999 | McKeown et al. | 370/230 |
| 5,926,299 A | 7/1999 | Bayart et al. | 359/121 |
| 5,949,801 A | 9/1999 | Tayebati | 372/20 |
| 6,025,944 A | 2/2000 | Mendez et al. | 359/136 |
| 6,025,950 A | 2/2000 | Tayebati et al. | 359/244 |
| 6,041,071 A | 3/2000 | Tayebati | 372/64 |
| 6,097,533 A | 8/2000 | Atlas | 359/337 |
| 6,108,112 A | 8/2000 | Touma | 359/110 |
| 6,108,311 A | 8/2000 | Ramaswami et al. | 370/258 |
| 6,147,786 A | 11/2000 | Pan | 359/124 |
| 6,192,173 B1 | 2/2001 | Solheim et al. | 285/24 |
| 6,212,182 B1 | 4/2001 | McKeown | 370/390 |
| 6,301,274 B1 | 10/2001 | Tayebati et al. | 372/20 |
| 6,556,338 B1 * | 4/2003 | Han et al. | 359/298 |

FOREIGN PATENT DOCUMENTS

| | | |
|---|---|---|
| EP | 0 439 646 A1 | 1/1990 |
| EP | 0 419 840 A2 | 8/1990 |
| EP | 0 667 690 A2 | 1/1995 |
| EP | 0 788 005 A2 | 8/1997 |
| JP | 2-278132 | 11/1990 |
| JP | 6-350563 | 12/1994 |
| JP | 8-163048 | 6/1996 |
| JP | 9-326780 | 12/1997 |
| WO | 98/05995 | 2/1998 |
| WO | 99/22496 | 5/1999 |
| WO | 99/56433 | 11/1999 |
| WO | 00/05832 | 2/2000 |
| WO | 01/15368 A2 | 3/2001 |
| WO | 01/18576 A1 | 3/2001 |

OTHER PUBLICATIONS

Fowles, Grant R., Introduction to Modern Optics, 1975, Dover Publications, Inc., 2nd edition, pp. 90-96.*
Pedrotti et al, Introduction to Optics, 1993, Prentice Hall, 2nd edition, pp. 236-244.*
Arthurs et al., "HYPASS: An Optoelectronic Hybrid Packet Switching System," IEEE Journal on Selected Areas in Communications, vol. 6, No. 9, pp. 1500-1510, Dec. 1988.
Chen et al., "A Media-Access Protocol for Packet-Switched Wavelength Division Multiaccess Methropolitan Area Networks," IEEE Journal of Selected Areas in Communications, vol. 8, No. 6, pp. 1048-1057, Aug. 1990.
"39 ·5 Million-Way WDM Broadcast Network Employing Two Stages of Erbium-Doped Fibre Amplifiers," Electronics Letters, vol. 26, No. 22, pp. 1882-1884, Oct. 25, 1990.
"39 ·81 Gbit/s, 43 ·8 Million-Way WDM Broadcast Network with 527 km Range," Electronics Letters, vol. 27, No. 22, pp. 2051-2053, Oct. 24, 1991.
Appleton et al., "Modelling WDM Video Distributive Networks," The Institution of Electrical Engineers, pp. 1-4, 1993.
Agrawal, "Fiber-Optic Communication Systems," A Wiley-Interscience Publication, The Institute of Optics University of Rochester NY, pp. 284-360, 1997.
Ford et al., "Fiber-Coupled Variable Attenuator Using a MARS Modulator," Invited Paper, SPIE, vol. 3226, pp. 86-93, 1997.
Sadot et al., "Tunable Optical Filters for Dense WDM Networks," IEEE Communications Magazine, pp. 50-55, Dec. 1998.
Carena et al., "OPERA: An Optical Packet Experimental Routing Architecture with Label Swapping Capability," Journal of Lightwave Technology, vol. 16, No. 12, pp. 2135-2145, Dec. 1998.
Misawa et al. "WDM Knockout Switch with Multi-Output-Port Wavelength-Channel Selectors," Journal of Lightwave Technology, vol. 16, No. 12, pp. 2212-2219, Dec. 1998.
Sadot et al., "Optical Switching Speed Requirements for Terabit/Sec Packet Over WDM Networks," ECOC, 1999.
Elhanany et al., "A Novel Tbit/sec Switch Architecture for ATM/WDM High-Speed Networks," IEEE/IEICE ATM Workshop, Japan, pp. 97-101, 1999.
Elhanany et al., "Tbit/s switching scheme for ATM/WDM networks," Electronics Letters, vol. 35, No. 1, 2 pages, Jan. 7, 1999.
"A New Architecture for Switch and Router Design," PMC-Sierra, Inc., pp. 1-8, Dec. 22, 1999.
Tsukada et al., "WDM/SCM Broadcast-and-select Architecture for Streaming-media," IEEE, pp. 358-359, 2000.
Pesach et al., "Free-space optical cross-connect switch by use of electroholography," Applied Optics, vol. 39, No. 5, pp. 746-758, Feb. 10, 2000.
Sadot et al., "Optical Switching Speed Requirements for Terabit/Second Packet Over WDM Networks," IEEE Photonics Technology Letters, vol. 12, No. 4, pp. 440-442, Apr. 2000.
Goossen, "MEMS-Based Variable Optical Interference Devices," IEEE, Invited MB1, pp. 17-18, Aug. 2000.
Shrikhande et al., "HORNET: A Packet-Over-WDM Multiple Access Metropolitan Area Ring Network," IEEE Journal on Selected Areas in Communications, vol. 18, No. 10, pp. 2004-2016, Oct. 2000.
McKeown, "A quick tutorial on IP Router design," Optics and Routing Seminar, pp. 1-42, Oct. 10, 2000.
McKeown, "How might optics be used in IP routers and the Internet?," Optics and Routing Seminar, pp. 1-36, Oct. 24, 2000.
Chao et al., "An Optical Interconnection Network for Terabit IP Routers," Journal of Lightwave Technology, vol. 18, No. 12, pp. 2095-2112, Dec. 2000.
Elhanany et al., "A Prioritized Packet Scheduling Architecture for Provision of Quality-of-Service in Tbit/sec WDM Networks," IEEE, pp. 695-700, 2000.
Plastow et al., "Tunable lasers key to data-network migration," Lightwave, www.light-wave.com, pp. 148-152, Mar. 2001.
Nowak et al., "Stable supercontinuum generation in short lengths of conventional dispersion-shifted fiber," Department of Electrical Engineering and Computer Science, The University of Michigan, pp. 1-20.
Nowak et al., "Stable 200nm TDM/WDM source based on continuum generation in 2m of fiber," Department of Electrical Engineering and Computer Science, The University of Michigan, pp. 1-13.
"Comparison of Techniques for Multi-Tb/s TDM/WDM Source," The University of Michigan.
Bayne et al., "Broadcast-and-select OADM enables low-cost transparency," LIGHTWAVE, www.light.wave.com, pp. 69-74, Dec. 2001.
"Corning Discovering Beyond Imagination," Presented at STARTRAX, 13 pages, 2001.

Fernandez et al., "TCP Switching: Exposing Circuits to IP," Stanford University, pp. 1-6.

Walker et al., "Mechanical Anti-Reflection Switch (MARS) Device for Fiber-in-the-Loop Applications," Invited FA1, pp. 59-60.

McKeown, "Fast Switched Backplane for a Gigabit Switched Router," Department of Electrical Engineering, Stanford University, CA, pp. 1-30.

"Broadcast and Distribution Networks," 7.1.2, pp. 289-297.

McKeown et al., "The Two-Stage Switch," Leland Stanford Junior University, 12 pages.

Fernandez, "Where Does Circuit Switching Make Sense In the Internet?," High Performance Networking Group, Stanford University, 19 pages.

U.S. Appl. No. 10/004,095, filed Dec. 3, 2001, (068069.0114), entitled "Optical Routing Using a Star Switching Fabric," by Islam et al., pp. 1-92.

U.S. Appl. No. 10/006,001, filed Dec. 3, 2001, (068069.0116), entitled "Optical Routing Using Star Switching Fabric with Reduced Effective Switching Time," by Islam pp. 1-94.

U.S. Appl. No. 10/005,998, filed Dec. 3, 2001, (068069.0117), entitled "Method and Apparatus for Scheduling Communication Using a Star Switching Fabric," by Islam, pp. 1-83.

U.S. Appl. No. 10/004,996, filed Dec. 3, 2001, (068069.0118), entitled "Broadcast and Select Optical Networking," by Islam et al., pp. 1-63.

M. Zutah, "A New PLL with Fast Settling Time and Low Phase Noise," Technical Feature, Microwave Journal, 8 pages, Jun. 1998 © 1998.

K.W. Goossen, et al., "Integrated mechanical anti-reflection switch (MARS) device for fiber-to-the-home applications," Proceedings of Conference on Sensors and Systems, Ananheim, California, 2 pages, Meeting held Apr. 16-18, 1996.

K.W. Goossen, et al., "Micromechanical Gain Slope Compensator for Spectrally Linear Optical Power Equalization," IEEE Electronics Technology Letters, vol. 12, No. 7, 3 pages, Revised Mar. 2, 2000.

J.E. Ford, et al., "Micromechanical Fiber-Optic Attenuator with 3 µs Response," Journal of Lightwave Technology, vol. 16, No. 9, 8 pages, Revised Jun. 17, 1998.

J.A. Walker, et al., "Fabrication of a Mechanical Antireflection Switch for Fiber-to-the-Home Systems," Journal of Microelectromechanical Systems, vol. 5, No. 1, 7 pages, Mar. 1996.

E.C. Vail, et al., "GaAs micromachined widely tunable Fabry-Perot filters," Electronics Letters, vol. 31, No. 3, 2 pages, Feb. 2, 1995.

P. Tayebati, et al., "Microelectromechanical tunable filter with stable half symmetric cavity," Electronics Letters, vol. 34, No. 20, 2 pages, Oct. 1, 1998.

A.A.T.D. Tran, et al., Surface Micromachined Fabry-Perot Tunable Filter, IEEE Photonics Technology Letters, vol. 8, No. 3, 3 pages, Mar. 1996.

P. Tayebati, et al., "Widely Tunable Fabry-Perot Filter Using Ga(Al)As-Al0$_x$Deformable Mirrors," IEEE Photonics Technology Letters, vol. 10, No. 3, 3 pages, Mar. 1998.

E.C. Vail, et al., "High performance micromechanical tunable vertical cavity surface emitting lasers," Electronics Letters, vol. 32, No. 20, 2 pages, Sep. 26, 1996.

P. Tayebati, et al., "Microelectromechanical tuneable filters with 0.47 nm linewidth and 70 nm tuning range," Electronics Letters, vol. 34, No. 1, 2 pages, Jan. 8, 1998.

Unknown, "ELASTIC-45 tunable interferometer component," Solus Micro Technologies, Inc., 5 pages, © 2001.

Unknown, "Applications," Solus Micro Technologies, Inc., 2 pages, © 2001.

Dhar, "Seamless Optical Scaling: Enabling a Dynamic Network," Fiberoptic Product News, Aug. 2001.

Dhar et al., "Tunable lasers create dynamic networking capabilities," WDM Solutions, pp. 82, 84, 86, and 88, Sep. 2001.

* cited by examiner

HIGH SPEED MEMS DEVICE

RELATED APPLICATIONS

This application claims the benefit under 35 U.S.C. § 119(e) of U.S. Provisional Application Ser. No. 60/336,779, filed Dec. 3, 2001.

TECHNICAL FIELD OF THE INVENTION

This invention relates in general to the field of communications systems and, more specifically, to a MEMS interferometric device.

BACKGROUND

MEMS interferometric devices communicate desired wavelengths of light by selectively changing the optical cavity depth of the interferometer. Fabrication of conventional MEMS interferometric devices typically results in interferometric devices where the optical properties essentially define the electrical and mechanical properties. In other words, the speed and the drive voltage of the device are determined defacto as a result of the optical design requirements. Moreover, actuation of the interferometric device typically results in significant deformation of the movable portion of the interferometer, including the active region of the interferometer.

OVERVIEW OF EXAMPLE EMBODIMENTS

The present invention provides an improved method and apparatus for selectively communicating all or a portion of a desired wavelength of light. In accordance with the present invention, a method and apparatus for optimizing the optics and actuating mechanism of the device are provided that reduce or eliminate at least some of the shortcomings associated with prior approaches.

In one embodiment, a micro electro-mechanical switching (MEMS) device comprises an interferometer comprising an optical cavity and an actuator comprising an electrode gap. The actuator substantially supports at least a portion of the interferometer and imparts a force to at least a portion of the interferometer to cause a change in an optical characteristic of the interferometer.

In another embodiment, a micro electro-mechanical switching (MEMS) interferometric device comprises an interferometer comprising an inner mirror assembly and an outer mirror assembly. An optical cavity having a depth is formed between the inner mirror assembly and the outer mirror assembly. The device further comprises an actuator coupled to the interferometer, which comprises an inner conductor and an outer conductor. An electrode gap having a depth is formed between the inner conductor and the outer conductor. The depth of the optical cavity and the depth of the electrode gap are capable of being selected substantially independently of one another.

In another embodiment, a MEMS interferometric device comprises an interferometer comprising an inner mirror assembly and an outer mirror assembly. An optical cavity is formed between the inner mirror assembly and the outer mirror assembly. The device further comprises an actuator coupled to the interferometer, which comprises an inner conductor and an outer conductor. An electrode gap is formed between the inner conductor and the outer conductor. The optical cavity and electrode gap occupy physically separate spaces.

In still another embodiment, a MEMS interferometric device comprises a moveable mirror structure operable to selectively communicate a desired wavelength of light depending on the position of the moveable mirror structure. The device also comprises a frame coupled to moveable mirror structure and operable to substantially support the moveable mirror structure. A plurality of actuators are coupled to the frame and are operable to translate a substantially uniform force to the frame to cause movement of the moveable mirror structure. The frame substantially prevents deformation of the moveable mirror structure during movement.

In yet another embodiment, a MEMS interferometric device comprises an interferometer formed on a substrate and operable to selectively communicate a desired wavelength of light. The device further comprises a plurality of separate actuators formed on the same substrate and coupled to the interferometer. The plurality of actuators are collectively operable to selectively modify optical characteristics of the interferometer. The plurality of actuators occupy physically separate locations on the substrate from the location of the interferometer.

Depending on the specific features implemented, particular embodiments may exhibit some, none, or all of the following technical advantages. Various embodiments decouple the design of the optical cavity and electrode gap, which enables the optimization of the optical, mechanical, and electrical properties of the device substantially independent of one anther. Some embodiments of the present invention may substantially reduce the deformation of the interferometer's movable mirror assembly to improve the surface figure of that mirror assembly.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention, and for further features and advantages thereof, reference is now made to the following description taken in conjunction with the accompanying drawings, in which.

DETAILED DESCRIPTION OF EXAMPLE EMBODIMENTS

Figure 1:
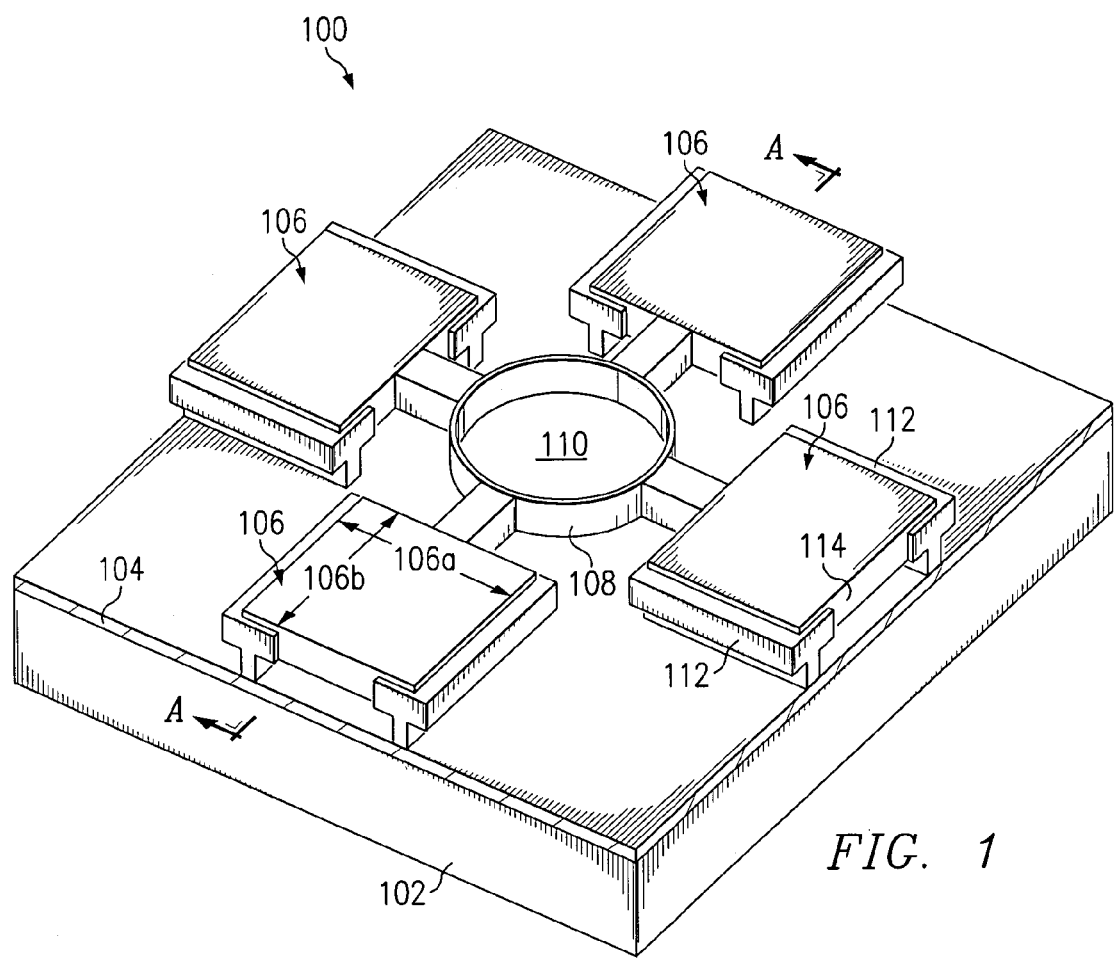
FIG. 1 is a block diagram of one embodiment of a MEMS interferometric device embodying various aspects of the present invention.

FIG. 1 is a block diagram of one embodiment of a micro-electro-mechanical switching (MEMS) interferometric device 100. In this example, device 100 includes an interferometer 110 operable to selectively communicate all or a portion of a desired wavelength of light and a frame 108 coupled to interferometer 110 and operable to substantially support at least a portion of interferometer 110. Device 100 also includes a plurality of actuators 106 coupled to frame 108, which are operable to selectively move at least a portion of frame 108 relative to a substrate 102, causing a change in the optical characteristics of interferometer 110. In this example, device 100 further includes an inner conductive layer 104 residing inwardly from plurality of actuators 106 and operable to support a voltage differential between inner conductive layer 104 and plurality of actuators 106.

In this example, interferometer 110 comprises a stationary inner mirror assembly residing outwardly from substrate 102 and a movable outer mirror assembly supported by frame 108. In alternative embodiments, both the inner mirror assembly and the outer mirror assembly may comprise movable mirror assemblies, or the inner mirror assembly may comprise a movable mirror assembly and the outer mirror assembly may comprise a stationary mirror assembly. A space between the inner and outer mirror assemblies defines an optical cavity of interferometer 110. Each mirror assembly may comprise any number of layers of one or more materials capable of providing a desired optical response. For example, each mirror assembly may comprise a single layer or a plurality of layers. Implementing plurality of stacked layers in each mirror assembly provides an advantage of substantially improving the line width of device 100. In the illustrated embodiment, each mirror assembly comprises an at least partially reflective material. The reflectivity of the material can be selected as a matter of design choice.

Frame 108 may comprise any geometric shape capable of supporting at least a portion of interferometer 110. In this example, frame 108 comprises a cylindrical shape capable of supporting the movable mirror assembly. As used throughout this document the term "cylindrical shape" refers to any substantially round shape having sufficient thickness to support interferometer 110, such as a circular, an elliptical, or a polygonal shape. In an alternative embodiment, frame 108 could comprise a disk or plate covering all or a portion of the movable mirror assembly of interferometer 110, or disposed inwardly from and supporting the movable mirror assembly.

Frame 108 could be formed integrally with or separately from actuators 106 and/or the outer mirror assembly of interferometer 110. The term "frame" can refer to a unitary structure substantially surrounding and/or covering the outer mirror, or could refer to a plurality of support points on actuator 106 coupled to the outer mirror assembly. In some embodiments, frame 108 can comprise a portion of the same structure forming actuators 106. In other embodiments, frame 108 could exist as a physically separate element from actuators 106. Frame 108 transfers the relative motion of actuators 106 to at least a portion of interferometer 110.

Interferometer 110 selectively communicates all or a portion of desired wavelengths of light by selectively modifying the depth of the optical cavity of interferometer 110. Plurality of actuators 106 move relative to substrate 102 to selectively change the position of the movable mirror assembly and, consequently, the depth of the optical cavity of interferometer 110 by moving the movable mirror assembly coupled to frame 108. Plurality of actuators 106 may comprise any number of actuation devices capable of selectively moving frame 108 relative to substrate 102 in response to an applied force.

In the illustrated embodiment, actuators 106 comprise four actuators. Any number of actuators, however, could be used without departing from the scope with the invention. In a particular example, actuators 106 reside symmetrically around frame 108 and translate a substantially uniform force to frame 108. Applying a uniform force to frame 108 provides an advantage of substantially reducing the surface deformation of the movable mirror assembly supported by frame 108.

Actuators 106 may comprise any device capable of selectively moving in response to an applied force. In this example, plurality of actuators 106 move in response to an electrostatic force created by placing a voltage differential between an outer conductive layer 114 and an inner conductive layer 104. Other force inducing mechanisms could be used consistent with the invention, such as thermoelectric, electromagnetic, or piezo-electric forces.

In this particular example, outer conductive layer 114 is operable to deform upon application of a voltage differential between outer conductive layer 114 and inner conductive layer 104. Although outer conductive layer 114 is operable to deform in this example, either outer conductive layer 114 or inner conductive layer 104 could comprise the deforming layer or both layers 104, 114 could comprise deforming layers without departing from the scope of the present invention. Applying a deforming force to actuators 106 rather than the outer mirror assembly of interferometer 110 provides an advantage of reducing deformation of the outer mirror assembly, thus improving the performance of the device. A plurality of actuator supports 112 support each outer conductive layer 114 and create an electrode gap between each outer conductive layer 114 and inner conductive layer 104.

Outer conductive layer 114 may comprise a material selected to achieve, for example, a desired stiffness to mass ratio. Plurality of supports 112 preferably comprise a non-conductive material or a material surrounded by a non-conductive layer to avoid shorting inner conductive layer 104 and outer conductive layer 114.

In the illustrated example, inner conductive layer 104, which in this example resides outwardly from substrate 102, supports a voltage differential between inner conductive layer 104 and outer conductive layer 114. Inner conductive layer 104 may comprise any conductive material capable of supporting a voltage differential between inner conductive layer 104 and outer conductive layer 114.

Optimization of the performance of a MEMS interferometric device typically depends on several design factors, including a desired speed and finesse, a desired drive voltage, and a desired optical response. The finesse of a device is the ratio of the free spectral range to the full width at half-maximum transmission. Design of the actuator mechanism typically depends upon the desired speed, finesse, and drive voltage of the device. Device speed and finesse depend at least in part on the stiffness to mass ratio of the actuator mechanism. Increasing the stiffness of the actuator mechanism typically results in an increase in device speed.

The drive voltage of the device typically depends on the stiffness of the actuator assembly and on the capacitive area within the device. Thus, increasing the stiffness of the actuator mechanism normally causes an increase in the necessary drive voltage, unless the increased stiffness is offset by an increase in device capacitance. Increasing the capacitance of the device can be achieved, for example, by decreasing the electrode gap or by increasing the surface area of the conductive layers within the device.

Transmission of a desired amount of the desired wavelength or wavelengths of light typically depends at least in part on the ability to maintain an approximately consistent surface figure for the outer mirror assembly. The surface figure of a mirror assembly is the curvature of the surface that causes variation in the optical cavity depth. Changes in the surface figure of a mirror assembly typically result from deformation of the outer mirror assembly upon application of an electrostatic force.

Conventional fabrication techniques for MEMS interferometric devices typically result in devices where the optical cavity and the electrode gap share the same physical location. Consequently, in those designs the depth of the optical cavity essentially defines the depth of the electrode gap. In other words, the speed and drive voltage of the device (determined in part by the electrode gap) are determined defacto as a result of the optical design considerations. Moreover, in those designs, the mirrors themselves serve as the actuating devices, or the actuating devices substantially cover the mirrors, either case resulting in significant deformation of the mirrors during actuation. This deformation results in a variation in the cavity depth along the width of the mirror assembly, prevents the desired wavelength from fully passing, and increases full width at half maximum transmission. In attempting to prevent deformation, conventional MEMS interferometric devices increase the stiffness of the movable mirror assembly, typically by increasing the thickness of the movable mirror assembly compared to the stiffness of the structure supporting the mirror assembly. Using this method to increase the relative stiffness results in a decrease in device speed and/or a reduction in the active area of the device.

Unlike conventional MEMS interferometric devices, device 100 decouples the design of the electrode gap of the actuators from the design of the optical cavity of the interferometer. Decoupling the design of the optical cavity and electrode gap enables the optimization of the optical, electrical, and mechanical properties of device 100 substantially independent of one another. Moreover, utilizing actuators that are distinct and separate from the movable mirror assembly provides an advantage of substantially reducing the deformation of the movable mirror assembly and improving the surface figure of that mirror assembly.

The structure of the present invention enables significant design freedom to optimize the optical, electrical, and mechanical properties of MEMS interferometric devices. In this design the optics may be optimized and designed separately from the actuating mechanism and electronics. In particular, the design of the optical cavity, the finesse, and the surface figure of the optics may be performed without significant consideration of the mechanical or electrical portion of the device. In particular, the dimensions and materials selected for the mirror assemblies of interferometer 110 as well as the nominal optical cavity depth can be chosen without regard to the actuating mechanism used.

Following the design and optimization of the optics, the device may be designed to operate at a desired speed using a selected drive voltage. In some embodiments, the device may be capable of selectively modifying the optical cavity depth from a first depth to a second depth in ten (10) milliseconds or less, or even one (1) millisecond or less. In other embodiments, the device may be capable of selectively modifying the optical cavity depth in one-hundred (100) nanosecond or less, or even sixty (60) nanoseconds or less.

The speed of the device depends at least in part, on the stiffness of the actuator assembly. Increasing the speed of the device may be achieved, for example, by decreasing width 106A of actuators 106 or by increasing the thickness of outer conductive layer 114. In some embodiments, width 106A may comprise fifty (50) microns or more, in some cases up to one-thousand (1000) microns or more. Although this example uses fifty (50) microns or more as width 106A, an actuator width of less than fifty (50) microns can be used without departing from the scope of the present disclosure.

Designing device 100 to operate at a desired speed, the present invention enables the design of actuators 106 to lower the drive voltage without significantly affecting actuator stiffness and speed. Reducing the drive voltage depends at least in part on increasing the capacitive area of inner conductive layer 104 and outer conductive layer 114, thus increasing the capacitance of actuators 106. Increasing the capacitive area of actuators 106 may be achieved, for example, by increasing length 106B of outer conductive layer 114 and inner conductive layer 104 and/or by decreasing the electrode gap of actuators 106. In some embodiments, length 106B may comprise fifty (50) microns or more, in some cases up to one-thousand (1000) microns or more. Although this example uses fifty (50) microns or more as length 106B, an actuator length of less than fifty (50) microns can be used without departing from the scope of the present disclosure.

In one particular embodiment, actuators 106 may comprise a corrugated surface area further increasing the surface area and, thus, the capacitance of each actuator 106. Corrugating the surface area of inner conductive layer 104 and/or outer conductive layer 114 provides an advantage of increasing the capacitance and decreasing the drive voltage of actuators 106 without significantly changing the footprint area of the device. The physical separation of actuators 106 from interferometer 110 allows corrugating of the actuator without adversely affecting the optics of the device.

In operation, MEMS interferometric device 100 receives an optical signal and communicates all or a selected portion of a desired wavelength of the optical signal from device 100. Interferometer 110 can operate in transmission mode to transmit selected wavelengths while substantially reflecting other wavelengths. Alternatively, interferometer 110 can operate in reflection mode, reflecting desired wavelengths while substantially transmitting others. The wavelength communicated from device 100 depends on the depth of the optical cavity of interferometer 110, which is determined by the position of the outer mirror assembly relative to the inner mirror assembly of interferometer 110.

Actuators 106 are coupled to or include frame 108, which is coupled to the movable mirror assembly of interferometer 110. Actuators 106 operate to selectively change the position of the movable mirror assembly of interferometer 110 upon application of a force. In this example, each outer conductive layer 114 deforms along length 106B of actuators 106 upon application of an electrostatic force. In this particular example, each outer conductive layer 114 moves frame 108 toward the inner mirror assembly, thus, decreasing the optical cavity depth of interferometer 110. In one embodiment, frame 108 operates to reduce substantially the surface deformation of at least a portion of interferometer 110. In some embodiments, frame 108 operates to create a substantially uniform optical cavity depth over the width of interferometer 110 during operation. As used in this document, the term "substantially uniform depth" refers to a variation of one-quarter wavelength or less in optical cavity depth over the width of interferometer 110.

Creation of an electrostatic force may be achieved by generating a voltage differential between inner conductive layer 104 and each outer conductive layer 114 of actuators 106. In one embodiment, creation of a voltage differential may be achieved by applying a common voltage source to inner conductive layer 104 and grounding each outer conductive layer 114. In another embodiment, creation of a voltage differential may be achieved by applying a common voltage source to each outer conductive layer 114 of actuators 106 and grounding inner conductive layer 104. In some embodiments, a drive voltage of one (1) volt or more, one-hundred (100) volts or more, or two-hundred (200) volts or more can be applied to create the voltage differential.

In a particular embodiment, creation of a voltage differential may be achieved by applying separate voltage sources to each outer conductive layer 114 of actuators 106 and grounding inner conductive layer 104. In that embodiment, each voltage source may be independently controlled using an algorithm capable of substantially reducing any detected surface deformation of the movable mirror assembly. Applying separate voltage sources to each outer conductive layer 114 is advantageous in providing a mechanism for adjusting each applied voltage to maintain the surface figure of interferometer 110 within an acceptable range. For example, the illustrated embodiment can achieve a surface figure of $\lambda \div 20$ over an area of 10 cm$^2$. In some embodiments, a surface figure of $\lambda \div 20$ over 1 cm$^2$ can be achieved. In other embodiments, a finesse of 100 or more, 1,000 or more, or 10,000 or more can be achieved with an acceptable surface figure.

The voltage source coupled to device 100 operates to maintain the outer mirror assembly at a particular position within the optical cavity. Maintaining the position of the outer mirror assembly enables the transmission of the desired wavelength within acceptable transmission parameters. In a particular embodiment, the voltage source coupled to device 100 implements feedback circuitry to monitor the relative position of the inner and outer mirror assemblies and hence the optical performance of device 100. The feedback circuitry may comprise any detection system capable of directly or indirectly measuring the relative position between the inner and outer mirror assemblies of interferometer 110, such as, for example, an optical error detection system or an electrical error detection system.

In one embodiment, the voltage source may comprise a voltage source sufficiently stable to maintain changes in wavelength transmission to a magnitude of 3 dB or less as voltage fluctuates. In the illustrated embodiment, a change in position of the movable mirror assembly of 80 picometers or less results in a transmission change of a magnitude of less than 3 dB. In a more conservative embodiment, the voltage source maintains actuators 106 within 10 percent of the allowable displacement that will ensure transmission of the desired wavelength within acceptable parameters. In that embodiment, the voltage source provides a stability of 0.003 percent the maximum voltage, which maintains the movable mirror assembly within 8 picometers of the desired position.

By selectively varying the depth of the optical cavity between the inner mirror assembly and the outer mirror assembly, MEMS interferometric device 100 can operate, for example, as an optical switch, a variable optical attenuator, or a tunable optical filter.

FIGS. 2A–2H are cross sectional views of FIG. 1 along line A—A showing one example of a method of forming a portion of one embodiment of a MEMS interferometric device 200. Particular examples and dimensions specified throughout this document are intended for exemplary purposes only, and are not intended to limit the scope of the invention.

Figure 2A:
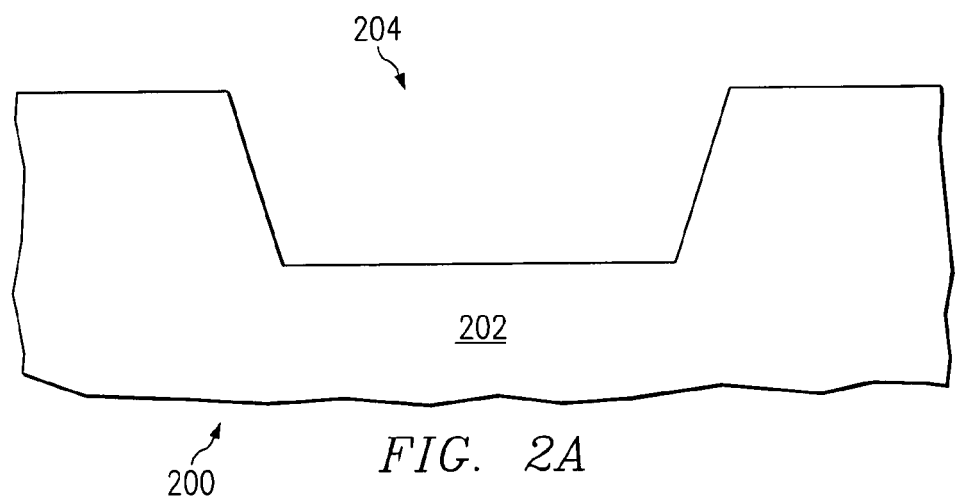
FIGS. 2A through 2H are cross-sectional views of FIG. 1 along line A—A illustrating one example of a method of forming a portion of one embodiment of a MEMS interferometric device.

FIG. 2A shows a cross-sectional view of device 200 after formation of an optics basin 204 within a substrate 202. Substrate 202 may comprise any at least substantially transmissive material, such as silicon, sapphire, and glass. Forming optics basin 204 may be effected through any of a variety of processes. In this particular embodiment, optics basin 204 may be formed, for example, by patterning and etching substrate 202 using photo resist mask and etch techniques.

Optics basin 204 may comprise any depth suitable to support a desired optics design. The depth of optics basin 204 depends at least in part on a desired optical cavity depth. In some embodiments, the depth of optics basin 204 can also be used to determine at least in part a desired electrode gap. In this particular embodiment, the depth of optics basin 204 comprises 1.7 microns. Optics basin 204 may comprise any dimension selected to accommodate a chosen optical characteristics and a selected electrode gap without departing from the scope of the present invention.

In some embodiments, an anti-reflective coating may be formed inwardly from substrate 202. Forming the anti-reflective coating may be effected, for example, by depositing a suitable anti-reflective material, such as silicon nitride with a thickness of one-quarter wavelength. Although this example utilizes silicon nitride with a one-quarter wavelength thickness, other materials and thickness could be used without departing from the scope of the present disclosure.

Figure 2B:
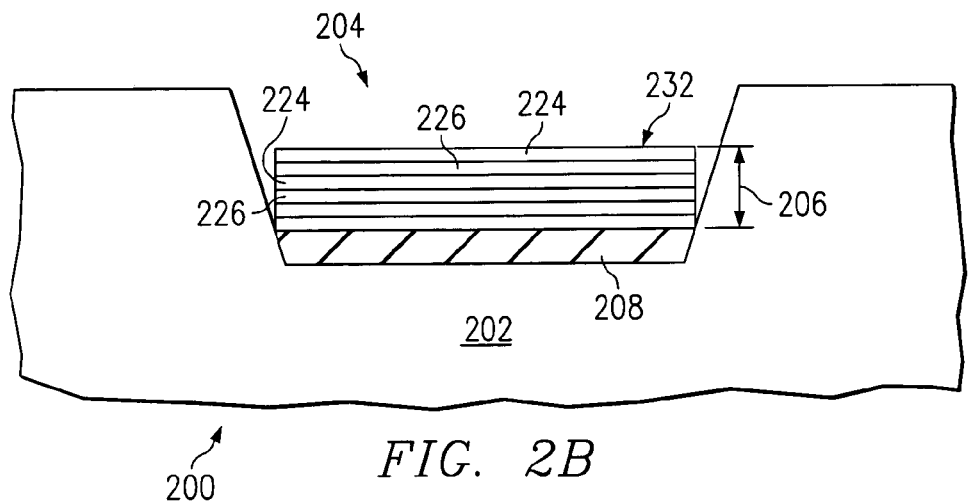

FIG. 2B shows a cross-sectional view of device 200 after formation of an anti-reflective coating 208 outwardly from substrate 202 and after formation of a inner mirror assembly 232 disposed outwardly from anti-reflective coating 208. Anti-reflective coating 208 may comprise any substantially anti-reflective material. For example, anti-reflective coating 208 could comprise any material or combination of materials capable of at least partially reducing the reflectivity of substrate 202. A one-quarter wavelength thickness of silicon nitride provides one example of such a material. In this particular embodiment, anti-reflective coating 208 comprises silicon nitride with a thickness of approximately 200 nanometers. Forming anti-reflective coating 208 may be effected, for example, by depositing the anti-reflective material.

In this embodiment, inner mirror assembly 232 comprises a mirror stack 206. Mirror stack 206 may comprise a single layer or a plurality of layers of alternating layer materials. The number of layers of mirror stack 206 depends at least in part on the desired reflectivity of mirror stack 206. In some embodiments, mirror stack 206 may comprise three (3) layers or more, nine (9) layers or more, or one-hundred layers (100) or more. In this example, mirror stack 206 comprises a plurality of alternating layers of a first material 224 and a second material 226. First material 224 and second material 226 may comprise any material or combination of materials, such as silicon, silicon dioxide, or silicon nitride. It is advantageous if first layer material 224 and second layer material 226 have a relatively large difference in their refractive indices. In this particular example, first material 224 comprises silicon and second material 226 comprises silicon dioxide. In an alternative embodiment, first material 224 comprises silicon and second material 226 comprises silicon nitride.

Forming mirror stack 206 may be effected through any of the variety of processes. For example, mirror stack 206 may be formed by alternately depositing first material 224 and second material 226.

The thickness of each of the plurality of layer materials 224, 226 depends at least in part on the desired wavelength (λ ref) to be communicated and an index of refraction (n) of the layer material. Determining the thickness of each of the plurality of layer materials 224, 226 may be achieved by:

$$\lambda\ ref \div 4n$$

In this particular embodiment, the thickness of first material 224 comprises approximately 116.5 nanometers and the thickness of second material 226 comprises approximately 280.5 nanometers. In that embodiment, the nominal wavelength considered comprises approximately 1620 nanometers and the total thickness of mirror stack 206 comprises approximately 1.7 microns.

Combining each first material 224 and second material 226 forms a period within mirror stack 206. The number of periods within mirror stack depends at least in part on the desired finesse and line width of the optics. In this particular embodiment, mirror stack 206 comprises 4.5 periods. Although mirror stack 206 comprises 4.5 periods in this example, mirror stack 206 could comprise another number of periods without departing from the scope of the present invention.

The width of mirror stack 206 depends at least in part on the diameter of a fiber intended for use with device 200. In some embodiments, the width of mirror stack 206 can comprise 10 microns or more, two-hundred fifty (250) microns or more, or five-hundred (500) microns or more.

In an alternative embodiment, a first mirror stack electrode may be formed outwardly from anti-reflective layer 208. The first mirror stack electrode may comprise any substantially transparent material. For example, the first mirror stack electrode may comprise doped silicon. Forming the first mirror stack electrode may be affected through any of a variety of processes. In one particular embodiment, the first mirror stack electrode may be formed by doping at least one of the layer materials used to form mirror stack 206.

Figure 2C:
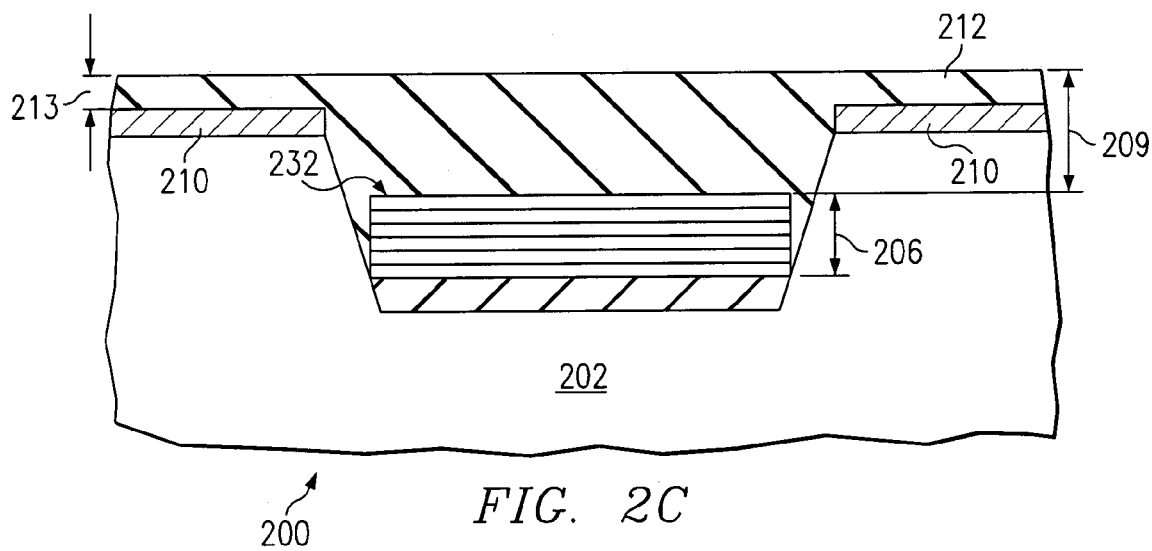

FIG. 2C shows a cross sectional view of device 200 after formation of an inner conductive layer 210 disposed outwardly from substrate 202 and after formation of a sacrificial layer 212 formed outwardly from inner mirror assembly 232 and inner conductive layer 210. Inner conductive layer 212 may comprise any material capable of supporting at least a portion of a voltage differential. For example, conductive layer 210 may comprise one or more layers of metal or doped polysilicon. In this particular embodiment, conductive layer 210 comprises a metallic plate with a thickness of approximately 100 nanometers. Although inner conductive layer 104 in this example comprises a plate, layer 104 could comprise another structure without departing from the scope of the present invention. In an alternative embodiment, inner conductive layer 210 may comprise strips of conductive material disposed outwardly from substrate 202 and disposed inwardly from actuators 106.

Forming inner conductive layer 210 may be effected, for example, by depositing a conductive material outwardly from substrate 202.

Sacrificial layer 212 may comprise, for example, polysilicon or spin-on-glass. Using a spin-on glass technique to form sacrificial layer 212 is advantageous in providing a good surface smoothness without additional polishing.

The thickness of sacrificial layer 212 disposed outwardly from inner mirror assembly 232 depends at least in part on a desired nominal optical cavity depth. Determination of a nominal optical cavity depth may be achieved by applying the following equation:

$$D_c = m \times \lambda\ ref \div 2n$$

Where m is an integer and n=1 for air. In this particular embodiment for a reference wavelength of 1620 nanometers, the nominal optical cavity depth and the thickness of sacrificial layer 212 disposed outwardly from inner mirror assembly 232 comprises approximately 810 nanometers. Selection of the reference wavelength depends at least in part on the wavelength spectrum desired for communication through or from device 200. In some embodiments, the reference wavelength can comprise the longest wavelength of the wavelength spectrum desired for communication through or from device 200.

In the illustrated embodiment, the thickness of sacrificial layer 212 disposed outwardly from inner conductive layer 210 determines the desired electrode gap. In this particular example, the thickness of sacrificial layer 212 disposed outwardly from inner conductive layer 210 comprises approximately 800 nanometers.

As can be appreciated from the figures, the illustrated process facilitates independent selection of the optical cavity depth and the electrode gap. For example, in this embodiment, the combination of the depth of the optical cavity 209 (C), plus the thickness of inner mirror stack 206 (IM) plus the thickness of anti-reflective coating 208 (AR) is equal to the depth of optics basin 204 (B) plus the thickness of inner conductive layer 210 (IC) plus the depth of electrode gap 213 (EG). In equation form, this relationship is:

$$B + IC + EG = C + IM + AR$$

Rearranging this equation reveals a relationship between the depth of optics basin 204 and other device parameters; namely:

$$B = C + IM + AR - IC - CG$$

Therefore, this technique allows the designer to independently select the dimensions for the optical portions of the device (namely C, IM, and AR) from the dimensions affecting the electrical characteristics of the device (namely IC and EG). Given those independently selected device dimensions, an optics basin depth 204 can be determined to accommodate the desired design.

Figure 2D:
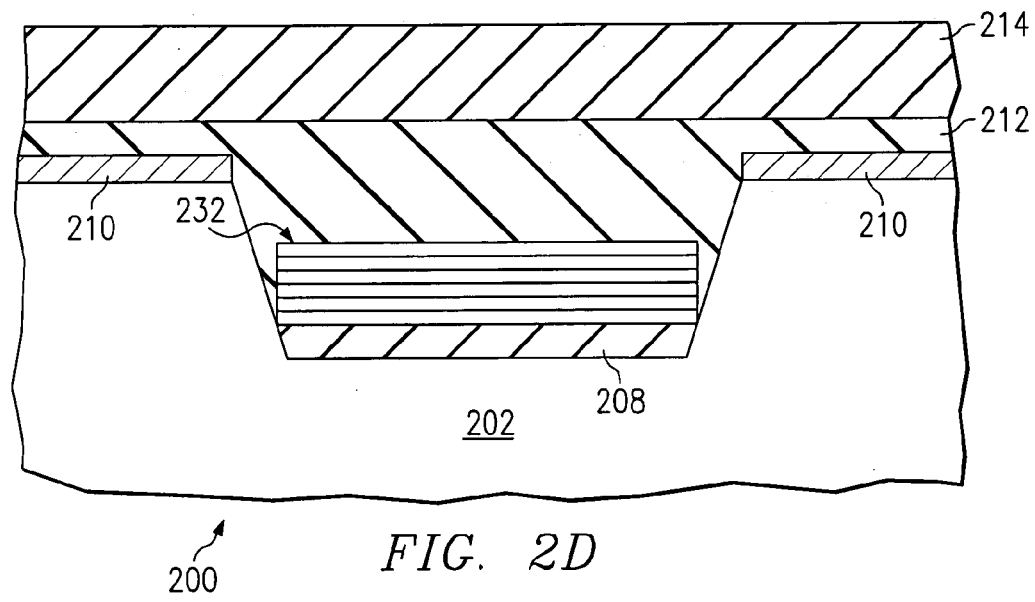

FIG. 2D shows a cross-sectional view of device 200 after formation of a structural layer 214 outwardly from sacrificial layer 212. Forming structural layer 214 may be effected, for example, by depositing a desired thickness of any material suitable to serve as an outer movable layer for actuator 106. This material could comprise, for example, a conductive material or any other material having a conductive layer or portion. The thickness of structural layer 214 depends at least in part on a desired speed of device 200. In this particular embodiment, structural layer 214 comprises polysilicon with a thickness of approximately 3 microns.

Figure 2E:
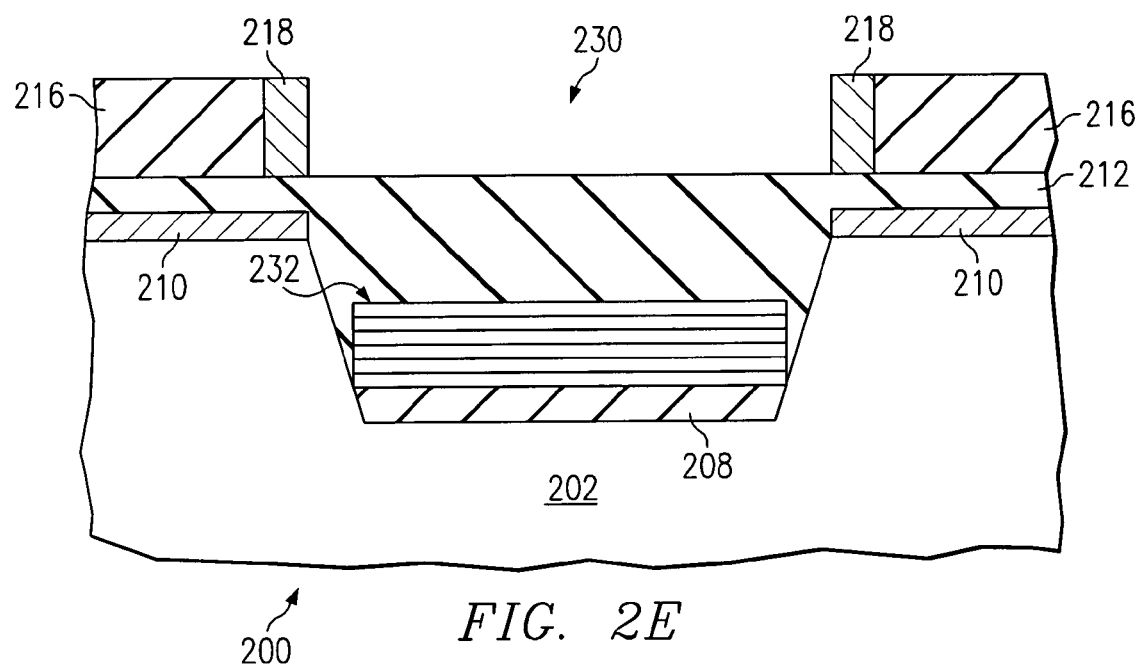

FIG. 2E shows a cross-sectional view of device 200 after formation of a frame cavity 230, a plurality of outer conductive layers 216, and a frame structure 218. The hatching shown on frame structure 218 in these figures is used merely to differentiate frame structure 218 from outer conductive layer 216 and is not intended to represent a requirement that frame structure 218 and outer conductive layer 216 comprise different materials. Outer conductive layers 216 and frame structure 218 may comprise any material, such as polysilicon or silicon nitride. In this particular embodiment, outer conductive layers 216 comprise doped polysilicon. Using doped polysilicon in outer conductive layers 216 is advantageous in enabling the creation of at least a portion of the capacitance between outer conductive layer 216 and inner conductive layer 210 without forming an additional conductive layer disposed outwardly from outer conductive layers 216.

Frame structure 218 may comprise any geometric shape, for example, a cylindrical or rectangular shape. In this example, frame structure 218 comprises a cylindrical shape with a height of approximately 3 microns, an inner diameter of approximately 198 microns, and an outer diameter of approximately 202 microns.

Forming frame cavity 230, outer conductive layers 216, and frame structure 218 may be effected, for example, by patterning and etching structural layer 214 using photo resist mask and etch techniques. Outer conductive layers 216 and frame structure 218 can be formed from the same structure forming structural layer 214. Alternatively, one of frame structure 218 and outer conductive layers 216 could be formed from structural layer 214 while the other is independently formed from a separate structure. This may be advantageous, for example, where it is desired that frame structure 218 be formed from a non-conductive material to further reduce the probability of deforming the outer mirror assembly.

Figure 2F:
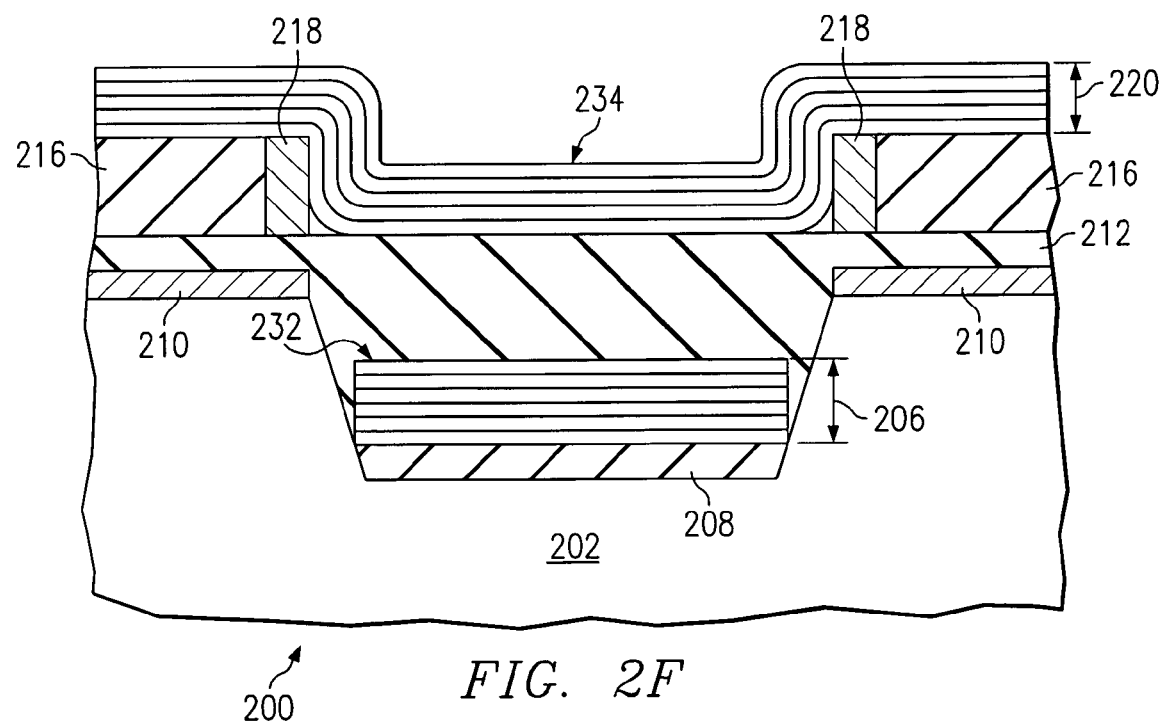

FIG. 2F shows a cross-sectional view of device 200 after formation of an outer mirror assembly 234. The structure and function of outer mirror assembly 234 can be substantially similar to inner mirror assembly 232 or could be designed separately from inner mirror assembly 232. In this particular embodiment, inner mirror assembly 232 and outer mirror assembly 234 each comprise a mirror stack 206, 220, respectively, with an equal number of periods of similar layer materials and an approximately equal mirror stack thickness.

Forming outer mirror assembly 234 may be effected through any of a variety of processes. For example, outer mirror assembly 234 can be formed by depositing a plurality of layer materials within frame cavity 230 and outwardly from frame structure 218 and outer conductive layers 216.

In an alternative embodiment, a second mirror stack electrode may be formed outwardly from outer mirror assembly 234. The second mirror stack electrode may comprise any substantially transparent material. For example, the second mirror stack electrode may comprise doped silicon. Forming the second mirror stack electrode may be affected through any of a variety of processes. In one particular embodiment, the second mirror stack electrode may be formed by doping at least one of the layer materials used to form outer mirror assembly 234.

Figure 2G:
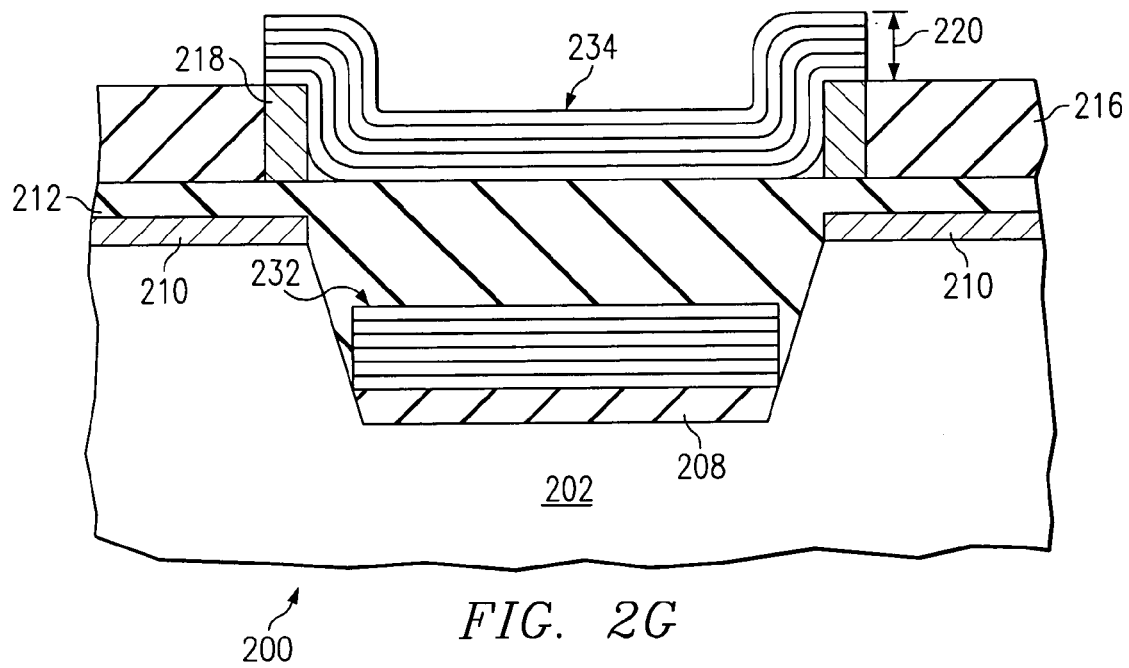

FIG. 2G shows a cross-sectional view of device 200 after removal of a portion of outer mirror assembly 234. A portion of outer mirror assembly 234 may be removed, for example, by etching at least a portion of outer mirror assembly 234 disposed outwardly from outer conductive layers 216.

Figure 2H:
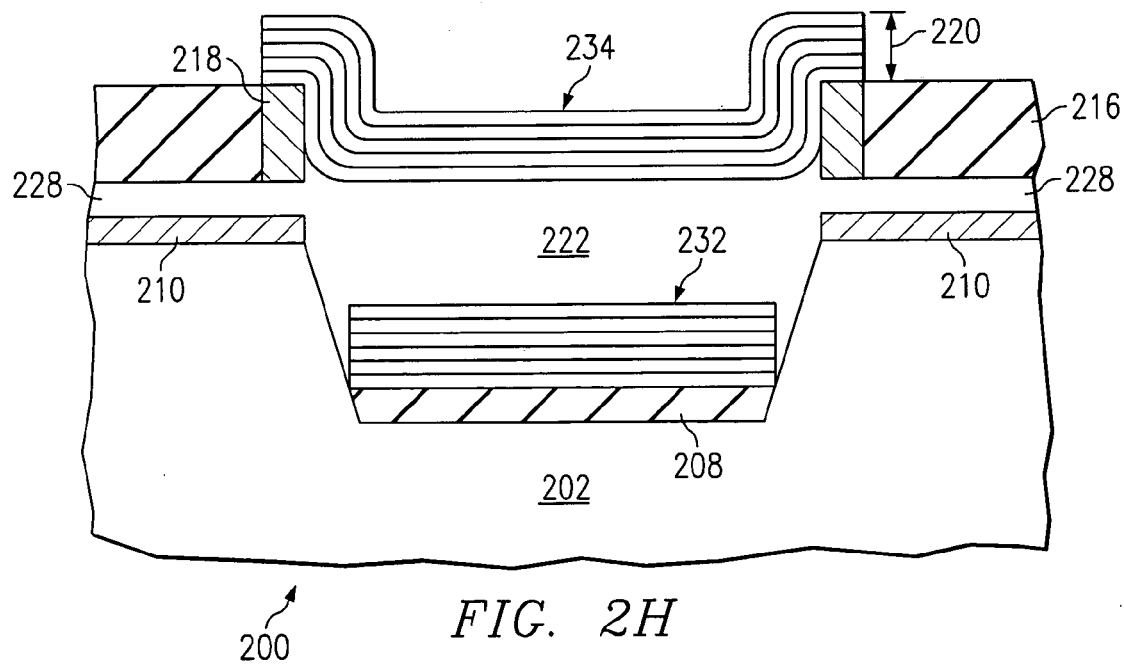

FIG. 2H shows a cross-sectional view of device 200 after formation of an optical cavity 222 and an electrode gap 228. Forming optical cavity 222 and electrode gap 228 may be effected through any of a variety of processes. For example, optical cavity 222 and electrode gap 228 may be formed by removing a portion of sacrificial layer 212. In this particular example, optical cavity 222 and electrode gap 228 may be formed, for example, by patterning and etching sacrificial layer 212 using photo resist mask and etch techniques.

In the illustrated embodiment, outer mirror assembly 234 is formed after forming outer conductive layers 216 and frame structure 218. In an alternative embodiment, outer mirror assembly may be formed prior to forming structural layer 214, outer conductive layers 216, and frame structure 218. In that embodiment, outer mirror assembly 234 can be deposited outwardly from sacrificial layer 212 and etched to a desired optics length, structural layer 214 may then be deposited adjacent to outer mirror assembly 234 and bonded to outer mirror assembly 234.

Figure 3A:
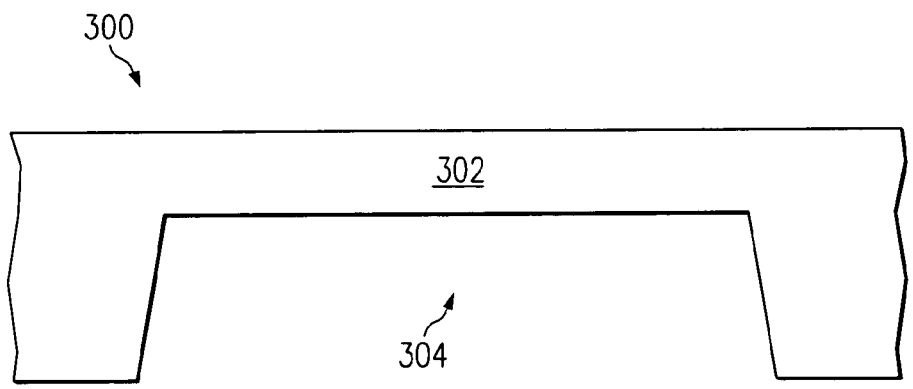
FIGS. 3A through 3H are cross-sectional views of FIG. 1 along line A—A illustrating one example of a method of forming a portion of another embodiment of a MEMS interferometric device.

FIGS. 3A–3H are cross-sectional views of FIG. 1 along line A—A showing an example of a method of forming a portion of another embodiment of a MEMS interferometric device 300. FIG. 3A shows a cross-sectional view of device 300 after formation of an optical fiber guide 304 within a substrate 302. Substrate 302 may comprise any at least substantially transmissive material, such as silicon, sapphire, and glass. Forming optical fiber guide 304 may be effected through any of a variety of processes. In this particular embodiment, optical fiber guide 304 may be formed, for example, by patterning an etching substrate 302 using photo resist mask and etch techniques. Optical fiber guide 304 may comprise any appropriate diameter and depth sufficient to guide an optical fiber. In this example, optical fiber guide 304 comprises a depth of approximately 200 microns and a diameter of approximately 200 microns.

Figure 3B:
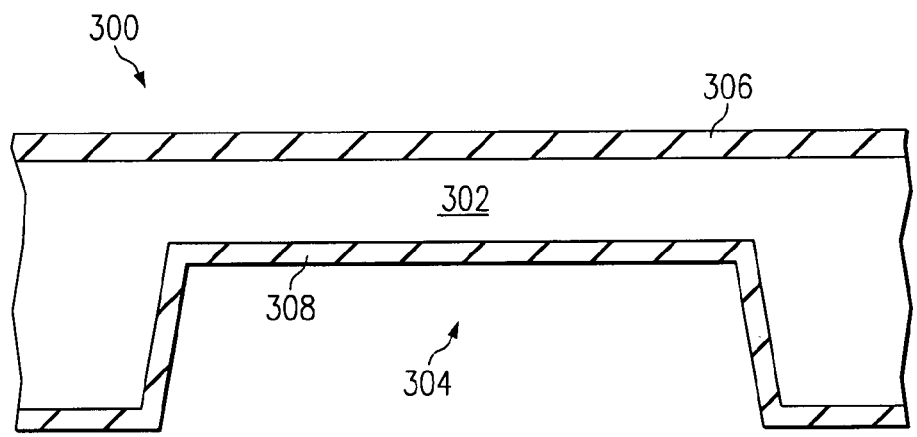

FIG. 3B shows a cross-sectional view of device 300 after formation of a first anti-reflective layer 306 outwardly from substrate 302 and after formation of a second anti-reflective layer 308 within optical fiber guide 304 and inwardly from substrate 302. The structure and function of layer 306 and layer 308 can be substantially similar to anti-reflective coating 208. In this particular embodiment, first anti-reflective layer 306 and second anti-reflective layer 308 each comprise substantially similar layer materials and an approximately equal thickness.

Forming first anti-reflective layer 306 and second anti-reflective layer 308 may be effected through any of a variety of processes. For example, first anti-reflective layer 306 and second anti-reflective layer 308 may be formed by depositing a suitable anti-reflective material, such as silicon nitride with a thickness of one-quarter wavelength.

Figure 3C:
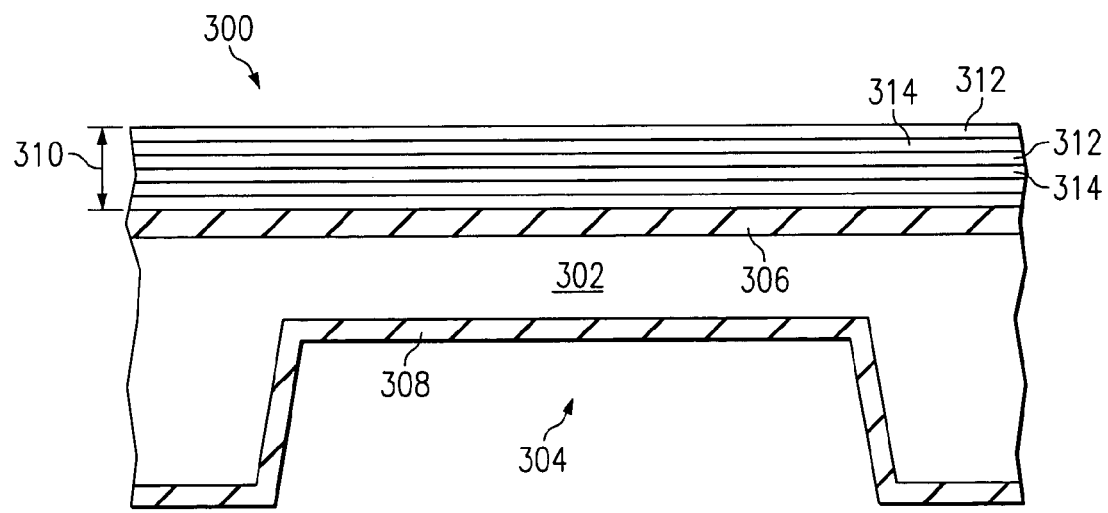

FIG. 3C shows a cross-sectional view of device 300 after formation of an inner mirror stack 310 outwardly from first anti-reflective layer 306. The structure and function of inner mirror stack 310 can be substantially similar to inner mirror stack 206. In this particular embodiment, inner mirror stack 310 comprises a mirror stack with a plurality of alternating layer materials forming a multiple period stack.

Forming inner mirror stack 310 may be effected through any of the variety of processes. For example, inner mirror stack 310 can be formed by depositing alternating layers of a first material 312, such as polysilicon, and a second material 314, such as silicon dioxide.

Figure 3D:
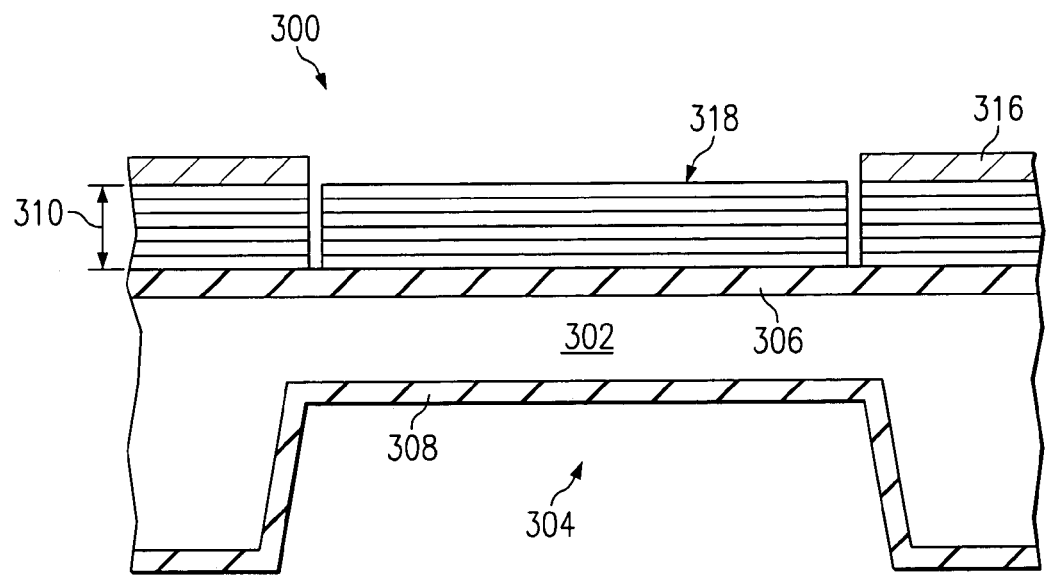

FIG. 3D shows a cross-sectional view of device 300 after formation of an inner mirror assembly 318 and a inner conductive layer 316. The structure and function of inner mirror assembly 318 can be substantially similar to inner mirror assembly 232. In this particular embodiment, inner mirror assembly 318 comprises a mirror stack with a plurality of alternating layers of layer materials forming a multi-period stack.

Forming inner mirror assembly 318 may be effected through any of a variety of processes. In this particular embodiment, inner mirror assembly 318 may be formed, for example, by patterning and etching inner mirror stack 310 using photo resist mask in etch techniques.

The structure and function of inner conductive layer 316 can be substantially similar to inner conductive layer 210. In this particular embodiment, inner conductive layer 316 comprises a metallic plate having a thickness of approximately 100 nanometers. In this example, inner conductive layer 316 resides directly outwardly from materials used to form inner mirror stack 310 without interstitial layers disposed between them. Alternatively, one or more interstitial layers of material could reside between inner mirror stack 310 and inner conductive layer 316, depending on the desired relationship between the depth of the optical cavity to be formed outwardly from inner mirror assembly 318 and the electrode gap to be formed outwardly from inner conductive layer 316. The position of inner conductive layer 316 relative to the outer surface of inner mirror assembly 318 can be selected to reside at a desired dimension.

In an alternative embodiment, a degree of design freedom to optimize an optical cavity and electrode gap may be achieved by removing at least a portion of inner mirror stack 310 disposed between inner conductive layer 316 and first anti-reflective layer 306. In that embodiment, a spacer layer having any desired dimension may be formed between anti-reflective layer 306 and inner conductive layer 316 sufficient to provide a desired optical cavity and a desired electrode gap.

Figure 3E:
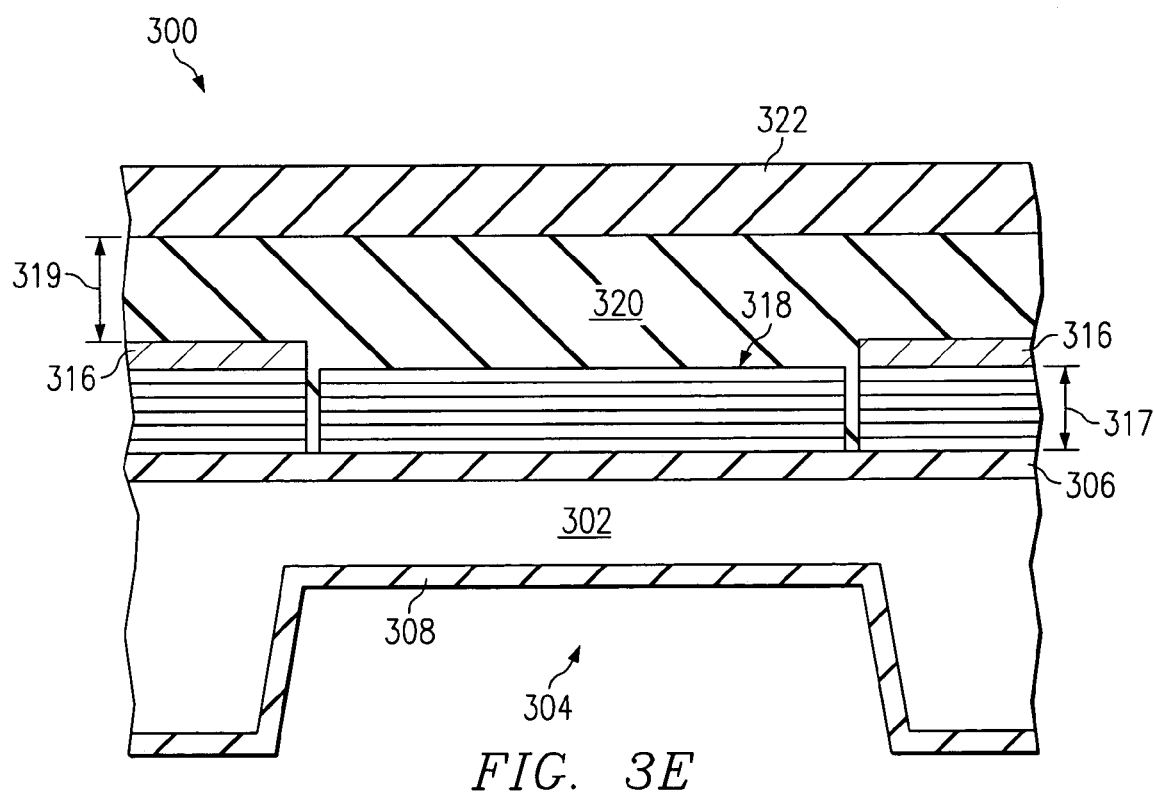

FIG. 3E shows a cross-sectional view of device 300 after formation of a sacrificial layer 320 outwardly from inner mirror assembly 318 and inner conductive layer 316, and after formation of a structural layer 322 outwardly from sacrificial layer 320. The structure and function of sacrificial layer 320 can be substantially similar to sacrificial layer 212. In this particular example, sacrificial layer 320 comprises a material whose thickness depends at least in part on a desired optical cavity and a desired electrode gap. Forming sacrificial layer 320 may be effected, for example, by using a spin-on glass technique.

Again, although the thickness of sacrificial layer 320 depends on both the depth of the optical cavity to be formed outwardly from inner mirror assembly 318 and the depth of the electrode gap to be formed outwardly from inner conductive layer 316, it should be noted that this design process facilitates independent selection of those cavity depths.

In particular, in this example, the thickness of inner mirror assembly 318 (IM) plus the depth of the optical cavity (C) is equal to the combination of the thickness of the spacer 317 (S) supporting inner conductive layer 316, plus the thickness of inner conductive layer 316 (IC) plus the depth of the electrode gap 319 (EG). For a given optical design using a particular inner mirror assembly thickness and a particular optical cavity depth, the electrode gap 319 can be independently selected from the optical cavity depth simply by adjusting the dimension of spacer 317 supporting inner conductive layer 316. Like the design shown in FIG. 2, this design facilitates independent optimization of the optical characteristics of the interferometer and of the electrical characteristics of the actuators.

The structure and function of structural layer 322 can be substantially similar to structural layer 214. Forming structural layer 322 may be effected, for example, by depositing a material, such as silicon or silicon nitride.

Figure 3F:
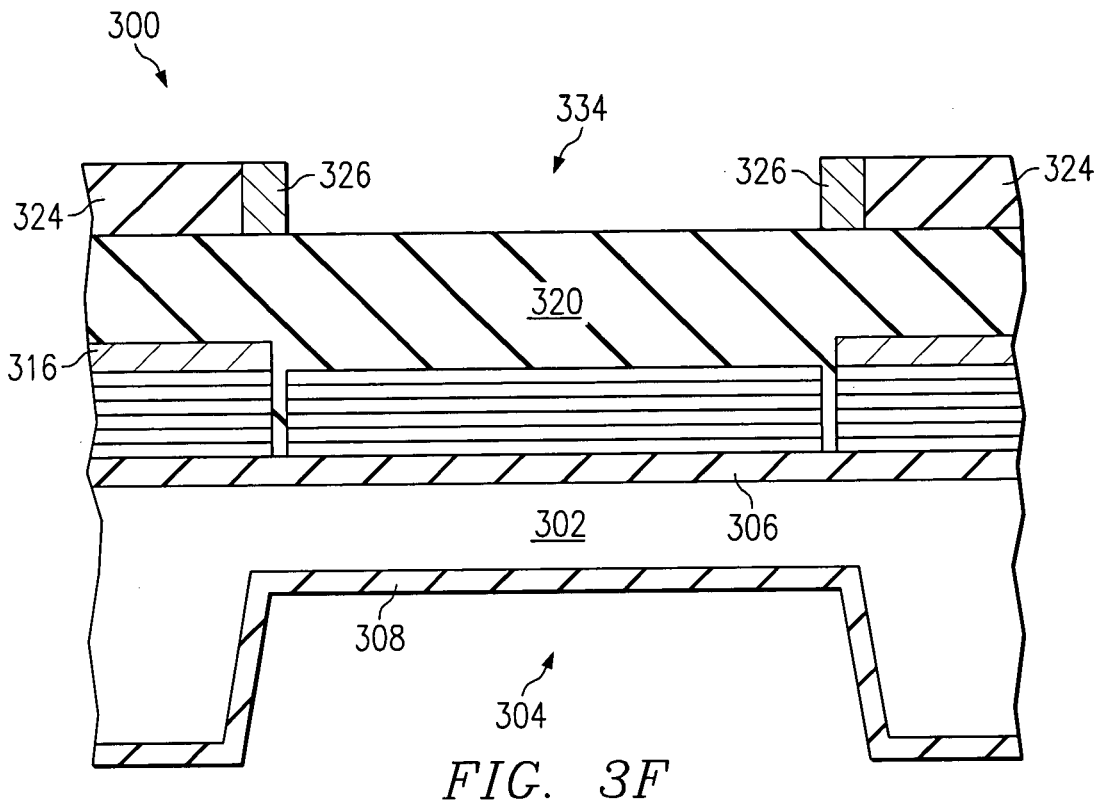

FIG. 3F shows a cross-sectional view of device 300 after formation of a frame cavity 334, a frame structure 326, and a plurality of outer conductive layers 324. The hatching shown on frame structure 326 in these figures is used merely to differentiate frame structure 326 from outer conductive layer 324 and is not intended to represent a requirement that frame structure 326 and outer conductive layer 324 comprise different materials. The structure and function of frame cavity 334, frame structure 326, and outer conductive layers 324 can be substantially similar to frame cavity 230, frame structure 218, and outer conductive layers 216. Forming frame cavity 334, frame structure 326, and outer conductive layers 324 may be effected, for example, by patterning and etching structural layer 322 using photo resist mask and etch techniques. In this example, frame structure 326 and outer conductive layers 324 are formed from the same material by patterning and etching those structures from the material used to form structural layer 322. Alternatively, frame structure 326 and outer conductive layers 324 could be formed from different materials. For example, outer conductive layers 324 can be formed from a substantially conductive material to facilitate maintenance of a voltage differential between inner conductive layer 316 and outer conductive layers 324, while frame structure 326 could be formed from a substantially nonconductive material. This design can be advantageous in further decoupling the mechanical actuation of device 300 from its optical characteristics. In particular, this design may further reduce or eliminate deformation of the outer mirror assembly when the device is actuated.

Figure 3G:
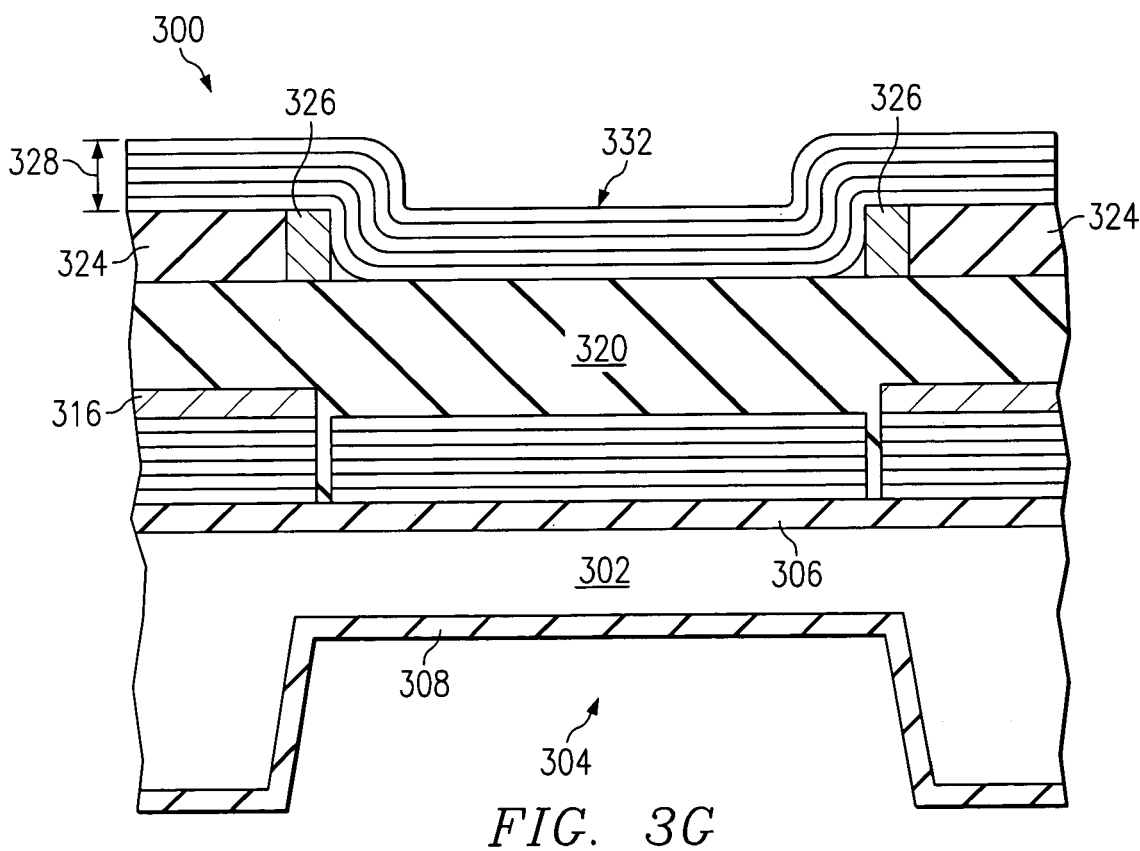

FIG. 3G shows a cross-sectional view of device 300 after formation of an outer mirror assembly 332. The structure and function of outer mirror assembly 332 can be substantially similar to outer mirror assembly 234. In this particular embodiment, outer mirror assembly 332 comprises a mirror stack 328 having a plurality of alternating layers of layer materials. Forming outer mirror assembly 232 may be effected, for example, by depositing alternating layers of layer materials.

Figure 3H:
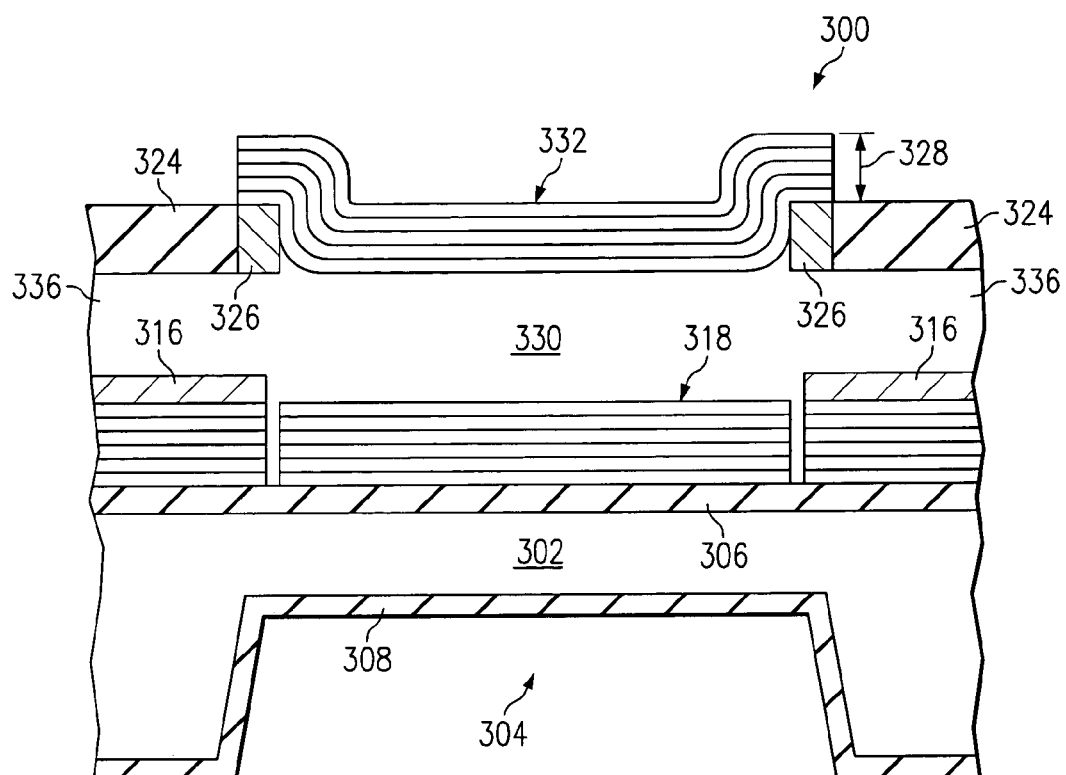

FIG. 3H shows a cross-sectional view of device 300 after removal of at least a portion of outer mirror assembly 332 disposed outwardly from outer conductive layers 324 and after formation of optical cavity 330 and electrode gap 336. Removal of at least a portion of outer mirror assembly 332 may be effected, for example, by patterning and etching outer mirror assembly 332 using photo resist mask and etch techniques. Optical cavity 330 and electrode gap 336 may be formed, for example, by patterning and etching sacrificial layer 320 using photo resist mask and etch techniques.

Figure 4:
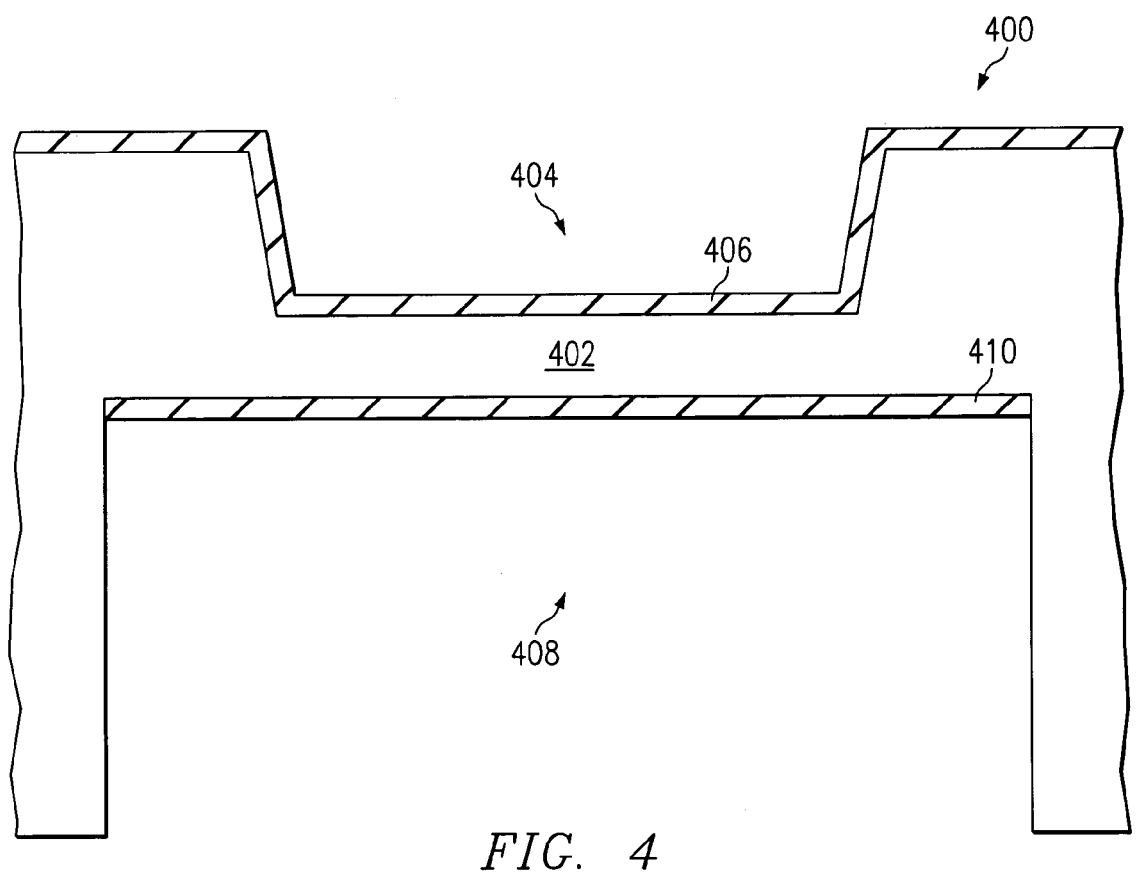
FIG. 4 is a cross-sectional view showing one example of a method of forming one embodiment of a MEMS interferometric device cover useful with MEMS devices including those described herein.

FIG. 4 shows a cross-sectional view of a MEMS interferometric device cover 400 after formation of an optical fiber guide 404 within a cover structure 402, a device cavity 408 within cover structure 402, an anti-reflective layer 406 disposed outwardly from cover structure 402, and an anti-reflective layer 410 disposed within device cavity 402. The structure and function of optical fiber guide 404 and anti-reflective layers 406, 410 can be substantially similar to optical fiber guide 304 and anti-reflective layers 306, 308, respectively. Optical fiber guides 304 and 404 operate to receive optical fibers and provide a mechanism for securing those fibers. Forming optical fiber guide 404 may be effected, for example, by patterning and etching cover structure 402 using photo resist mask and etch techniques.

Device cavity 408 may comprise a depth and a width sufficient to house device 300 without substantially interfering with device operation. In this embodiment, device cavity 408 comprises a depth of 50 microns and a width of 2 millimeters.

Figure 5:
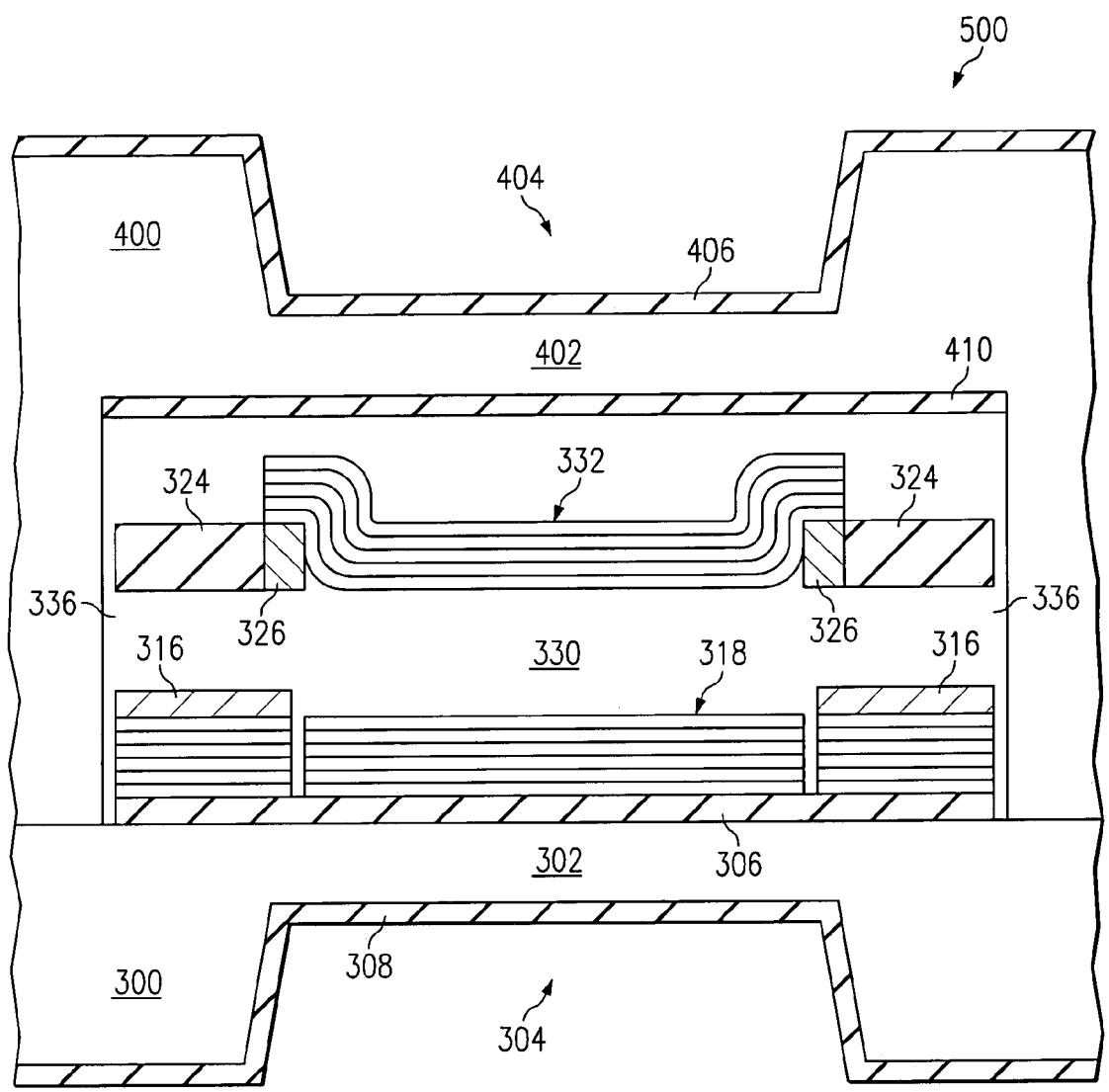
FIG. 5 is a cross-sectional view showing one example of a method of forming one embodiment of a MEMS interferometric device useful with MEMS devices including those described herein.
Figure 6A:
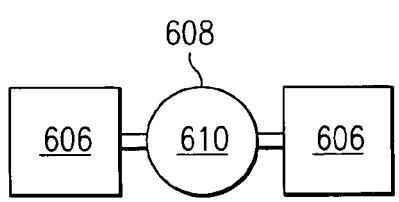
FIGS. 6A through 6D is a block diagram illustrating exemplary embodiments of MEMS interferometric devices comprising two, three, four, and eight actuators.
Figure 6B:
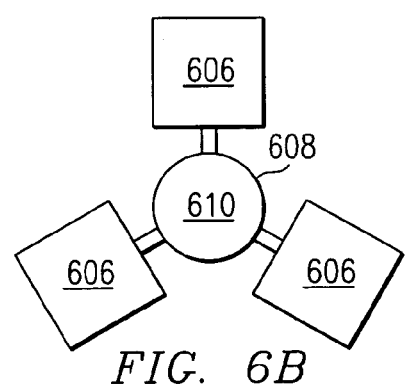
Figure 6C:
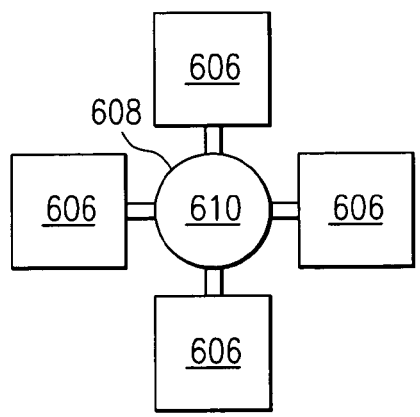
Figure 6D:
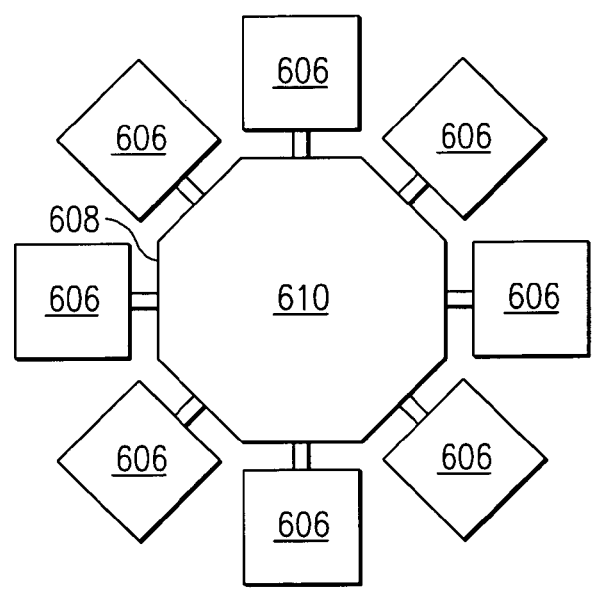

FIG. 5 shows a cross-sectional view of a MEMS interferometric device assembly 500 comprising device 300 and device cover 400 disposed outwardly from substrate 302. Forming device assembly 500 may be effected through any of a variety of processes. For example, device assembly 500 may be formed by bonding device cover 400 to substrate 302. In this particular embodiment, device assembly 500 may be formed, for example, by bonding device cover 400 to substrate 302 using a fusion bonding technique. In an alternative embodiment, device cover 400 may be bonded to substrate 302 using an anodic bonding technique. Although a bonding process is used in this example, another coupling technique could be used without departing from the scope of the present invention.

The fabrication techniques described herein and the resulting physical structures of optical devices provide significant design freedom in selecting optical characteristics of the device essentially independent of the electrical and mechanical characteristics of the device. Using techniques described herein and similar variations thereof, a high speed and efficient optical device with any desired optical characteristics can be formed. For example, a designer can optimize the optical characteristics of the design by selecting materials and dimensions for the mirror assemblies and optical cavity depth forming the interferometric portion of the device. The designer can independently select the width of the actuating device, which is the primary factor determining the resonant frequency of the actuator and the speed of the device. Having established the necessary speed of the device, the designer can determine an appropriate drive voltage for the actuators. Drive voltages can be reduced, for example, by reducing the electrode gap or by increasing the area of each actuator by increasing second dimension 106B for a given actuator width 106A.

In operation, these designs facilitate high speed operation while maintaining excellent optical characteristics. In particular, physically separating the movable mirror structure of the interferometer from the actuation devices using a plurality of symmetrically spaced actuators to laterally support the movable mirror structure reduces or eliminates deformation of the movable mirror structure during actuation. In a particular embodiment, a frame surrounding the movable mirror structure and coupled to the actuators further reduces or eliminates deformation of the movable mirror during actuation.

FIGS. 6A through 6D are block diagrams illustrating exemplary embodiments of MEMS interferometric devices comprising two, three, four, and eight actuators, respectively. Each MEMS interferometric device comprises an interferometer 610, a frame 608 and a plurality of actuators 606. The structure and function of actuators 606, frame 608, and interferometer 610 can be substantially similar to actuators 106, frame 108, and interferometer 110 of FIG. 1, respectively. In these examples, actuators 606 reside symmetrically around frame 608 and translate a substantially uniform force to frame 608.

Figure 7:
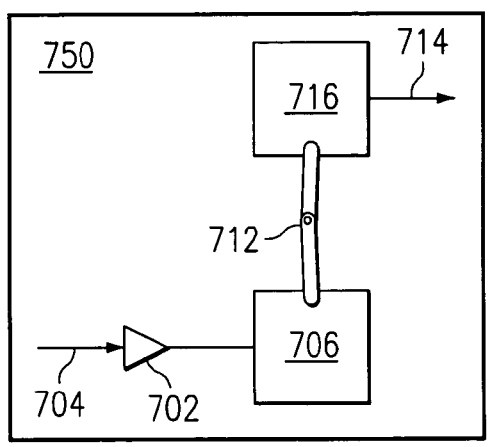
FIG. 7 is a block diagram of one exemplary embodiment of a MEMS voltage controlled capacitor.

FIG. 7 is a block diagram of one exemplary embodiment of a MEMS voltage controlled capacitor 750. In this example, MEMS voltage controlled capacitor 750 includes an amplifier 702 operable to amplify a control signal 704 received from a feedback detection system. Capacitor 750 also includes an actuator 706 operable to selectively change an optical cavity depth of an interferometer coupled to actuator 706 by mechanical link 712 based on control signal 704 received by amplifier 702. In this example, capacitor 750 includes a capacitive transducer 716 operable to generate a feedback signal 714 based on the optical cavity depth of the interferometer. In one particular embodiment, capacitor 750 is included in a voltage control oscillator.

In one particular example, capacitive transducer 716 comprises a pair of transparent electrodes, one of the pair of electrodes coupled to or comprising an inner mirror assembly and the other electrode coupled to or comprising an outer mirror assembly of the interferometer.

In this particular example, capacitive transducer 716 is operable to provide a measure of the distance between inner and outer mirror assemblies. Knowing the relative position of the mirror assemblies allows a system operator to ascertain, indirectly, the wavelength frequency being transmitted through or reflected from the interferometer.

Amplifier 702 may comprise, for example, an electrical amplifier. Control signal 704 may comprise, for example, an adjustment voltage or an error signal received from a feedback detection system. In some embodiments, the feedback system may comprise, for example, an analog or a digital feedback system.

Figure 8:
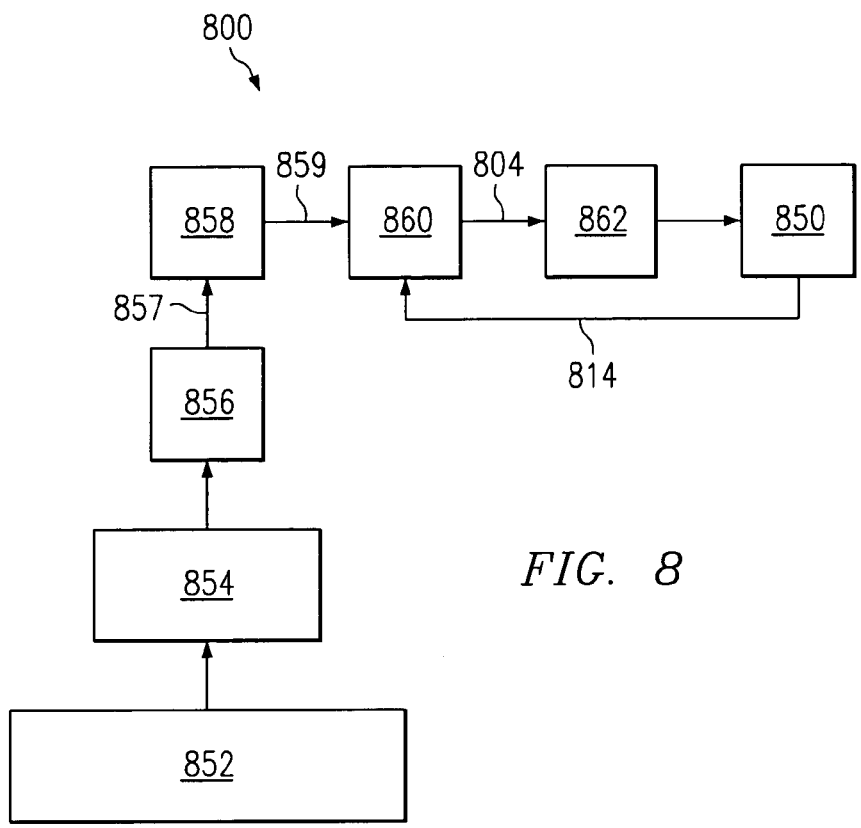
FIG. 8 is a block diagram of one exemplary embodiment of an analog feedback control system.

FIG. 8 is a block diagram of one exemplary embodiment of an analog feedback control system 800. In this example, system 800 includes a voltage controlled oscillator 850 operable to generate a feedback control signal 814. In one particular embodiment, voltage controlled oscillator 850 includes voltage controlled capacitor 750 of FIG. 7.

In this particular embodiment, system 800 also includes a phase comparator 860 operable to generate a control signal 804, and a filter 862 coupled between comparator 860 and oscillator 850. In this particular example, phase comparator 860 operates to compare the phase of a reference frequency 859 to the phase of feedback signal 814 to generate control voltage 804. Filter 862 filters control voltage 804 to generate control signal 704 of FIG. 7.

In this particular embodiment, system 800 includes a control interface 852 operable to determine a desired optical characteristic of an interferometer coupled to system 800. System 800 further includes an address translator 854 operable to generate a digital representation of the desired optical characteristic, and a digital to analog converter 856 operable to convert the digital representation to an analog representation 857. System 800 also includes a reference voltage controlled oscillator 858 operable to receive analog representation 857 and to generate reference frequency 859.

Figure 9:
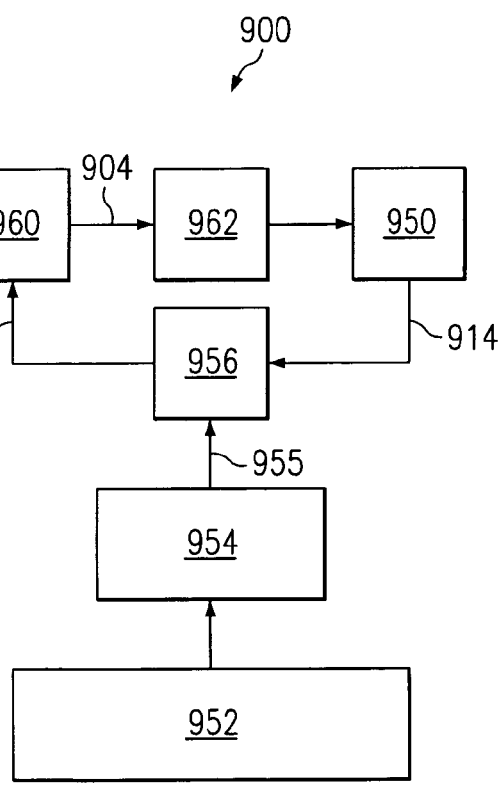
FIG. 9 is a block diagram of one exemplary embodiment of a digital feedback control system.

FIG. 9 is a block diagram of one exemplary embodiment of a digital feedback control system 900. In this example, system 900 includes a voltage controlled oscillator 950 operable to generate a feedback control signal 914. In one particular embodiment, voltage controlled oscillator 950 includes voltage controlled capacitor 750 of FIG. 7.

System 900 also includes a first counter 956 coupled to oscillator 950 and operable to generate a feedback count 957. In this particular example, first counter 956 operates to divide feedback signal 914 by an amount determined by a digital signal 955 representing a desired optical characteristic. System 900 further includes a phase comparator 960 operable to generate a control signal 904, and a filter 962 coupled between comparator 960 and voltage controlled oscillator 950. In this particular example, phase comparator 960 operates to compare the phase of a reference count 965 to the phase of feedback count 957.

In this particular embodiment, system 900 includes a control interface 952 operable to determine the desired optical characteristic of an interferometer coupled to system 900. System 900 further includes an address translator 954 coupled to control interface 952 and operable to generate digital signal 955 representing the desired optical characteristic.

System 900 also includes a reference voltage controlled oscillator 958 operable to generate an approximately constant reference frequency 959. In this example, system 900 includes a second counter 964 coupled to reference oscillator 958 and operable to generate reference count 965 based at least in part on reference frequency 959.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. An interferometric micro electro-mechanical switching (MEMS) device comprising:
    an interferometer comprising an optical cavity having a depth and formed between an inner mirror assembly and an outer mirror assembly, the depth of the optical cavity comprising a substantially uniform depth over a width of the interferometer during operation, wherein the substantially uniform depth of the optical cavity comprises a variation of no more than one-quarter wavelength over the width of the interferometer; and
    an actuator coupled to the interferometer and comprising an inner conductor, an outer conductor, and at least two actuator supports, the outer conductor comprising a width and a length, the at least two actuator supports comprising at least a first actuator support and a second actuator support, wherein an electrode gap having a depth is formed between the inner conductor and the outer conductor, wherein the first actuator support and the second actuator support are disposed substantially along the length of the outer conductor, wherein the first actuator support is disposed substantially along a first side of the outer conductor and the second actuator support is disposed substantially along a second side of the outer conductor, and wherein the first side of the outer conductor is separated from the second side of the outer conductor by approximately the width of the outer conductor;
    wherein the depth of the optical cavity and the depth of the electrode gap are capable of being selected substantially independently of one another and wherein the outer conductor operates to move relative to the inner conductor by deforming between the at least two actuator supports and substantially along the length of the outer conductor in response to a voltage differential between the outer conductor and the inner conductor.

2. The MEMS device of claim 1, wherein the interferometer is capable of selectively communicating at least a portion of a desired wavelength depending on the depth of the optical cavity.

3. The MEMS device of claim 1, wherein the interferometer comprises a surface figure of at least $\lambda$ ref÷20 over an area of one (1) square centimeter, wherein $\lambda$ ref comprises one particular wavelength capable of being passed by the interferometer.

4. The MEMS device of claim 1, wherein the interferometer comprises a surface figure of at least $\lambda$ ref÷20 over an area of ten (10) square centimeters, wherein $\lambda$ ref comprises one particular wavelength capable of being passed by the interferometer.

5. The MEMS device of claim 1, wherein the optical cavity and electrode gap occupy physically separate locations on a common substrate.

6. The MEMS device of claim 5, wherein the common substrate comprises a substantially transmissive substrate.

7. The MEMS device of claim 1, wherein the outer mirror assembly comprises a movable mirror structure and the inner mirror assembly comprises a stationary mirror structure.

8. The MEMS device of claim 1, wherein the inner mirror assembly and the outer mirror assembly each comprise a width of 10 microns or more.

9. The MEMS device of claim 1, wherein the inner mirror assembly and the outer mirror assembly each comprise a width of five-hundred (500) microns or more.

10. The MEMS device of claim 1, wherein the actuator is capable of selectively modifying the optical cavity depth by moving at least a portion of the interferometer in response to the voltage differential between the outer conductor and the inner conductor.

11. The MEMS device of claim 1, wherein the actuator is capable of selectively modifying the optical cavity depth from a first depth to a second depth in ten (10) milliseconds or less.

12. The MEMS device of claim 1, wherein the actuator is capable of selectively modifying the optical cavity depth from a first depth to a second depth in one (1) millisecond or less.

13. The MEMS device of claim 1, wherein the actuator is capable of selectively modifying the optical cavity depth from a first depth to a second depth in 100 nanoseconds or less.

14. The MEMS device of claim 1, wherein the actuator comprises a width of fifty (50) microns or more.

15. The MEMS device of claim 1, wherein the actuator comprises a length of fifty (50) microns or more.

16. The MEMS device of claim 1, wherein the actuator comprises a plurality of actuators each coupled to at least a portion of the interferometer and capable of selectively modifying the depth of the optical cavity in response to a voltage differential between an outer conductor and an inner conductor for each of the plurality of actuators.

17. The MEMS device of claim 16, wherein the plurality of actuators comprises at least four (4) actuators residing substantially symmetric around the interferometer and capable of translating a substantially uniform force to at least a portion of the interferometer.

18. The MEMS device of claim 1, wherein the interferometer comprises a finesse of 100 or more.

19. The MEMS device of claim 1, wherein the interferometer comprises a finesse of 1,000 or more.

20. The MEMS device of claim 1, wherein the interferometer comprises a finesse of 5,000 or more.

21. The MEMS device of claim 1, further comprising:
    a voltage source capable of at least partially creating the voltage differential between the inner conductor and the outer conductor;
    a feedback control circuit capable of determining a relative position between the inner mirror assembly and the outer mirror assembly; and
    a frame coupled to the interferometer and capable of substantially reducing surface deformation associated with at least a portion of the interferometer.

22. The MEMS device of claim 21, wherein the voltage source comprises a substantially stable voltage source operable to maintain changes in wavelength transmission to a magnitude of 3 dB or less during voltage fluctuations.

23. The MEMS device of claim 21, wherein the voltage source is capable of maintaining the depth of the optical cavity within 10 percent of a position that substantially ensures transmission of a desired wavelength.

24. The MEMS device of claim 21, wherein the feedback control circuit comprises a detection system capable of measuring an electrical capacitance between the upper mirror assembly and the lower mirror assembly.

25. The MEMS device of claim 21, wherein the frame comprises a cylindrical shape capable of supporting at least a portion of the interferometer.

26. The MEMS device of claim 21, wherein the frame comprises a substantially transmissive sheet of material disposed inwardly from and supporting the outer mirror assembly.

27. The MEMS device of claim 21, wherein the frame comprises a substantially transmissive sheet of material disposed outwardly from and supporting the outer mirror assembly.

28. An interferometric micro electro-mechanical switching (MEMS) device comprising:
an interferometer formed on a substantially transmissive substrate and comprising a stationary mirror assembly and a moveable mirror assembly, wherein an optical cavity having a depth is formed between the stationary mirror assembly and the movable mirror assembly, wherein the interferometer comprises a finesse of 100 or more;
a frame substantially supporting the moveable mirror assembly;
a plurality of actuators coupled to the frame and located in substantially symmetric locations around the moveable mirror assembly, each of the plurality of actuators formed outwardly from the substantially transmissive substrate and comprising a stationary conductor, a moveable conductor, and at least two actuator supports, the moveable conductor comprising a width and a length, each of the at least two actuator supports comprising at least a first actuator support and a second actuator support, wherein an electrode gap having a depth is formed between each of the stationary conductors and each of the moveable conductors, wherein each of the first actuator support and the second actuator support are disposed substantially along the length of the movable conductor, wherein the first actuator support is disposed substantially along a first side of the movable conductor and the second actuator support is disposed substantially along a second side of the movable conductor, and wherein the first side of the movable conductor is separated from the second side of the movable conductor by approximately the width of the movable conductor;
wherein the depth of the optical cavity and the depth of the electrode gap are capable of being selected substantially independently of one another, wherein the moveable conductor for each of the plurality of actuators operates to move relative to the stationary conductor by deforming between the at least two actuator supports and substantially along the length of the moveable conductor in response to a voltage differential between the moveable conductor and the stationary conductor, and wherein the optical cavity and electrode gap occupy physically separate spaces.

29. The MEMS interferometric device of claim 28, wherein the movable mirror assembly comprises a surface figure of at least $\lambda$ ref÷20 over an area of ten (10) square centimeters, wherein $\lambda$ ref comprises one particular wavelength capable of being passed by the movable mirror assembly.

30. The MEMS interferometric device of claim 28, wherein the plurality of actuators are capable of selectively modifying the depth of the optical cavity from a first depth to a second depth in ten (10) milliseconds or less.

31. The MEMS interferometric device of claim 28, wherein the plurality of actuators are operable to translate a substantially uniform force to the frame to cause movement of the moveable mirror assembly.

32. An interferometric micro electro-mechanical switching (MEMS) device comprising:
an interferometer comprising an optical cavity having a depth and formed between an inner mirror assembly and an outer mirror assembly, wherein the interferometer comprises a finesse of 100 or more; and
an actuator coupled to the interferometer and comprising a stationary conductor, a moveable conductor, and at least two actuator supports, the moveable conductor comprising a width and a length, the at least two actuator supports comprising at least a first actuator support and a second actuator support, wherein an electrode gap having a depth is formed between the stationary conductor and the movable conductor, wherein the first actuator support and the second actuator support are disposed substantially along the length of the movable conductor, wherein the first actuator support is disposed substantially along a first side of the movable conductor and the second actuator support is disposed substantially along a second side of the movable conductor, and wherein the first side of the movable conductor is separated from the second side of the movable conductor by approximately the width of the movable conductor;
wherein the depth of the optical cavity and the depth of the electrode gap are capable of being selected substantially independently of one another and wherein the moveable conductor operates to move relative to the stationary conductor by deforming between the at least two actuator supports and substantially along the length of the moveable conductor in response to a voltage differential between the moveable conductor and the stationary conductor.

33. The MEMS device of claim 32, wherein the interferometer comprises a finesse of 1,000 or more.

34. The MEMS device of claim 32, wherein the interferometer comprises a finesse of 5,000 or more.

35. An interferometric micro electro-mechanical switching (MEMS) device comprising:
an interferometer comprising an optical cavity having a depth and formed between an inner mirror assembly and an outer mirror assembly;
an actuator coupled to the interferometer and comprising a stationary conductor, a moveable conductor, and at least two actuator supports, the moveable conductor comprising a width and a length, the at least two actuator supports comprising at least a first actuator support and a second actuator support, wherein an electrode gap having a depth is formed between the stationary conductor and the movable conductor, wherein the first actuator support and the second actuator support are disposed substantially along the length of the movable conductor, wherein the first actuator support is disposed substantially along a first side of the movable conductor and the second actuator support is disposed substantially along a second side of the movable conductor, and wherein the first side of the movable conductor is separated from the second side of the movable conductor by approximately the width of the movable conductor;

a feedback control circuit capable of determining a relative position between the inner mirror assembly and the outer mirror assembly, wherein the feedback control circuit comprises a detection system capable of measuring an electrical capacitance between the upper mirror assembly and the lower mirror assembly; and wherein the depth of the optical cavity and the depth of the electrode gap are capable of being selected substantially independently of one another and wherein the moveable conductor operates to move relative to the stationary conductor by deforming between the at least two actuator supports and substantially along the length of the moveable conductor in response to a voltage differential between the moveable conductor and the stationary conductor.

36. The MEMS device of claim 35, further comprising:
a voltage source capable of at least partially creating a voltage differential between the stationary conductor and the moveable conductor; and
a frame coupled to the interferometer and capable of substantially reducing surface deformation associated with at least a portion of the interferometer.

37. The MEMS device of claim 1, wherein the deformation of outer conductor is approximately centered between the at least two supports disposed along the actuator length.

* * * * *